(12) United States Patent
Horita et al.

(10) Patent No.: US 7,559,221 B2
(45) Date of Patent: Jul. 14, 2009

(54) METHOD OF WORKING METAL, METAL BODY OBTAINED BY THE METHOD AND METAL-CONTAINING CERAMIC BODY OBTAINED BY THE METHOD

(75) Inventors: Zenji Horita, Fukuoka (JP); Katsuaki Nakamura, Fukuoka (JP); Koji Neishi, Fukuoka (JP); Michihiko Nakagaki, Fukuoka (JP); Kenji Kaneko, Fukuoka (JP)

(73) Assignee: Rinascimetalli Ltd., Fukuoka (JP)

( * ) Notice: Subject to any disclaimer, the term of this patent is extended or adjusted under 35 U.S.C. 154(b) by 0 days.

(21) Appl. No.: 12/002,951

(22) Filed: Dec. 19, 2007

(65) Prior Publication Data
US 2008/0110226 A1    May 15, 2008

Related U.S. Application Data

(62) Division of application No. 10/529,807, filed as application No. PCT/JP03/012440 on Sep. 29, 2003.

(30) Foreign Application Priority Data

| Sep. 30, 2002 | (JP) | ............................. 2002-285476 |
| Feb. 26, 2003 | (JP) | ............................. 2003-048844 |
| Mar. 10, 2003 | (JP) | ............................. 2003-064161 |

(51) Int. Cl.
*B21D 37/16* (2006.01)

(52) U.S. Cl. ...................... 72/342.6; 72/342.5; 72/371; 72/710; 148/558

(58) Field of Classification Search ................... 72/338, 72/342.1, 342.2, 342.5, 342.6, 342.94, 342.96, 72/364, 371, 430, 700, 710; 148/558
See application file for complete search history.

(56) References Cited

U.S. PATENT DOCUMENTS 2,767,767 A * 10/1956 Peterson ...................... 72/164

(Continued)

FOREIGN PATENT DOCUMENTS

| JP | 64-62224 | 3/1989 |
| JP | 3-180214 | 8/1991 |

*Primary Examiner*—Edward Tolan
(74) *Attorney, Agent, or Firm*—Jordan and Hamburg LLP

(57) ABSTRACT

A method of working metal in which the microstructure of metal body is rendered fine to thereby enhance the strength, ductility or homogeneity thereof; a metal body obtained by the metal working method; and a metal-containing ceramic body obtained by the metal working method. In this metal working method, the deformation resistance of metal body or metal-containing ceramic body (hereinafter referred to simply as "metal body") is lowered locally to thereby form low deformation resistance regions in the metal body, and shear deformation of the low deformation resistance regions is effected so as to fine the microstructure of metal body. In particular, the metal body is formed in unidirectionally drawn configuration so as to produce low deformation resistance regions crossing the metal body. Further, with respect to two non-low deformation resistance regions arranged to sandwich low deformation resistance region crossing the metal body, one non-low deformation resistance region is caused to have a relative position change to the other non-low deformation resistance region so as to effect shear deformation of the low deformation resistance region. The low deformation resistance regions can be moved along the direction of drawing of the metal body.

46 Claims, 10 Drawing Sheets

U.S. PATENT DOCUMENTS

| | | | | |
|---|---|---|---|---|
| 3,534,574 A | * | 10/1970 | McMaster | 72/57 |
| 3,622,404 A | * | 11/1971 | Thompson | 148/558 |
| 4,163,380 A | * | 8/1979 | Masoner | 72/342.1 |
| 4,437,329 A | * | 3/1984 | Geppelt et al. | 72/299 |
| 4,727,641 A | * | 3/1988 | Kanatani et al. | 29/447 |
| 5,252,152 A | | 10/1993 | Seror | |
| 5,345,799 A | * | 9/1994 | Miodushevski et al. | 72/19.8 |
| 6,742,374 B2 | * | 6/2004 | Ozawa | 72/342.5 |
| 6,932,876 B1 | | 8/2005 | Statnikov | |

\* cited by examiner

METHOD OF WORKING METAL, METAL BODY OBTAINED BY THE METHOD AND METAL-CONTAINING CERAMIC BODY OBTAINED BY THE METHOD

BACKGROUND OF THE INVENTION

The present invention relates to a method of working a metal in which the microstructure of the body is rendered fine to thereby enhance the strength, ductility or homogeneity thereof, a metal body obtained by the metal working method; and a metal-containing ceramic body obtained by the metal working method.

It is well known that the microstructure of the metal-containing material, such as a metal body or a metal-containing ceramic, is rendered fine by means of ECAP (Equal-Channel Angular Pressing) to thereby enhance the strength or ductility of the material.

With ECAP, as shown in FIG. 19, an insertion passage 200 is formed with preset bending angle in the middle of a mold 100. A metal body 300 to be processed is pressed and inserted into the insertion passage 200, thereby the metal body 300 is bent along the insertion passage 200, and the shearing stress is generated in the metal body 300 due to the bending, thus the shearing stress makes the microstructure fine. The reference numeral 400 in FIG. 19 represents the plunger of the metal body.

In such ECAP, in order to make the body 300 bend easily along the insertion passage 200, the mold 100 is heated up to a preset temperature, thereby the whole metal body 300 is heated and accordingly the deformation resistance thereof is reduced. However, if the deformation resistance of the metal body 300 is greatly reduced, unwanted deformation will occur in the metal body 300, thus the heating temperature of the metal body 300 must be limited in a required minimum range.

Furthermore, while heating the metal body 300 as described above, it is necessary to use much more power to press the plunger 400, thus there will be some problems such as the deterioration of processing property. A method of working metal material and the device thereof is disclosed in Japanese patent publication No. 2001-321825, in which a solution is proposed as follows: locally heating the shear deformation zone of the passage applying the shear stress on the metal body in order to reduce the deformation resistance of the shear deformation region of the metal body, therefore, it can reduce the power needed during pressing the plunger, thus to improve the processing property.

Furthermore, when the shear deformation zone is heated, the metal having passed the shear deformation zone still maintains a preset heating temperature, therefore the deformation resistance of the whole metal body pushed outside of the insertion passage is reduced. If the metal body is continuously passed through the insertion passage, for the sake of the shearing stress acting repeatedly, it must take enough time to cool the metal body under the preset temperature so as to increase the deformation resistance.

Therefore, it is very hard to perform the treatment by the ECAP method in less than cooling time continuously, thus a problem of low productivity occurs.

With the ECAP, it is necessary to insert the metal body into the bending insertion passage. Therefore, there is a problem that it is very difficult to render the microstructure of a portion of the metal body fine.

Furthermore, in the method of making a portion of the microstructure of the metal body fine, for example, disclosed in Japanese patent publication No. 11-51103, a probe provided at an end of the rotor along the axis thereof is made to closely contact with the required position and to press the metal body. The grain refinement of the metal is performed by the friction with the probe through rotor rotating.

Nonetheless, the method using the friction with the probe is difficult to realize the treatment with a high efficiency, therefore, there is a same problem in that the productivity is very low as the case of using the ECAP method.

On the other hand, it is known that a method of mass manufacturing the metal body with the grain refinement microstructure is disclosed in Japanese patent publication No. 11-323481, in which low carbon steel or low carbon alloy steel with preset components is processed by decreasing the cross-section area 60% or more during the cooling course from high temperature.

However, the metal body which can be processed by using aforesaid method is only restricted to the low carbon steel or low carbon alloy steel with special components. Therefore, there is a problem in that the metal body with other components cannot use this method.

As stated above, during the process for forming of the metal body with high strength or high ductility by making the microstructure fine, the advantages and the disadvantages are existed concurrently. At present, such kind of metal is only used for special purpose without caring for the manufacturing cost, such as a luxury car or a fighter plane etc.

Under these circumstances, especially in vehicle industry, it is desired to reduce the bodywork weight in order to optimize the burnup or improve the driveability. Thereby, there is a huge demand, not only for luxury car, but also for ordinary car, that the weight reduction must be realized by using the metal body with high strength or high ductility through making the microstructure fine. Accordingly, a huge potential demand exists for a cheap metal body with high strength or high ductility.

In view of such actual state, the present inventor has proceeded research and development to work out the present invention. It is an object to provide a metal body or metal-containing ceramic body with high strength or high ductility which can be continuously formed during the process for making the microstructure fine so that it is possible to improve the productivity, and obtain a metal body or metal-containing ceramic body with low cost.

BRIEF SUMMARY OF THE INVENTION

In a method of working a metal according to a first aspect of the invention, a low deformation resistance region, which deformation resistance is locally reduced, is formed in a metal body, and the low deformation resistance region is subjected to shear deformation thereby to fine the microstructure of the metal body. Thereby, it is possible to make the microstructure of low deformation resistance region fine which is locally formed, and it is easy to form a metal body with high strength or high ductility.

In the method of working a metal according to another aspect of the invention, the whole region of said low deformation resistance region is subjected to said shear deformation. Thereby, the microstructure with grain refinement can be formed homogeneously in the whole region of said low deformation resistance region.

In the method of working a metal according to yet another aspect of the invention, a portion of said low deformation resistance region is subjected to said shear deformation. Thereby, the shear deformation occurs in a portion of the deformation resistance region, and it is possible to make the microstructure of this portion remarkably fine, thus to improve the strength or the ductility of the metal.

In the method of working a metal according to yet another aspect of the invention, it comprises the steps of locally reducing the deformation resistance of a metal body extending in one direction; forming the low deformation resistance region crossing the metal body; and processing the low deformation resistance region and making it shear deformation, thereby making the microstructure of said metal body fine. Thereby, it is possible to make the part of the low deformation resistance region locally formed fine, and it is easy to form a metal body with high strength or high ductility.

In the method of working a metal according to yet another aspect of the invention, said shear deformation proceeds in the central area of said low deformation resistance region. Thereby, in the locally formed low deformation resistance region, it is possible to fine the microstructure of the center of the low deformation resistance region having a minimal deformation resistance, thereby to improve the strength or ductility of the metal body.

In the method of working a metal according to yet another aspect of the invention, said shear deformation proceeds in the both ends of said low deformation resistance region. Therefore, the non-low deformation resistance region with high resistance can withstand the shear deformation much more than the low deformation resistance region, thus the large shear stress can act on the both ends of the low deformation resistance region, and it is possible to make the microstructure effectively fine thereby to improve the strength or ductility of the metal body.

In the method of working a metal according to yet another aspect of the invention, said shear deformation proceeds at one end of said low deformation resistance region. Therefore, the non-low deformation resistance region with high resistance can withstand the shear deformation much more than the low deformation resistance region, thus the large shear stress can act on one end of the low deformation resistance region, and it is possible to make the microstructure fine effectively thereby to improve the strength or ductility of the metal body.

In the method of working a metal according to yet another aspect of the invention, said low deformation resistance regions are made to move along the extending direction of the said metal body. Thereby, it is very easy to make the microstructure of the whole metal body in one direction fine, and at the same time, to continuously proceed the grain refinement of the microstructure.

In the method of working a metal according to yet another aspect of the invention, it comprises the steps of locally reducing the deformation resistance of the metal body extending in one direction; forming the low deformation resistance region crossing the metal body; changing the position of one non-low deformation resistance region relative to the other non-low deformation resistance region in said metal body between which the low deformation resistance region is sandwiched; processing the low deformation resistance region and making it shear deformation, thereby making the microstructure of said metal body fine. Thereby, it is possible to make the microstructure of the locally formed low deformation resistance region fine, and it is easy to form a metal body with high strength or high ductility.

In the method of working a metal according to yet another aspect of the invention, said position change is caused by a vibration applied to said metal body in the direction approximately orthogonal to the extending direction of said metal body. Thereby, the shear deformation is easy to be generated in the low deformation resistance region.

In the method of working a metal according to yet another aspect of the invention, said position change is caused by a compound motion comprising a first vibration applied to said metal body along a first direction approximately orthogonal to the extending direction of said metal body, and a second vibration applied to said metal body along a second direction approximately orthogonal to said first direction and the said extending direction of the metal body. Thereby, the shear deformation is easy to be generated in the low deformation resistance region, and it is possible to make a large shear stress act on the low deformation resistance region.

In the method of working a metal according to yet another aspect of the invention, said position change is caused by a twisting motion applied to said metal body about a virtual axis of rotation approximately parallel to the said extending direction of the metal body. Thereby, the shear deformation is very easy to be generated in the low deformation resistance region.

In the method of working a metal according to yet another aspect of the invention, said low deformation resistance region is formed by heating a metal body by heating mechanism, said heating mechanism forms a heating distribution without taking said virtual axis of rotation region as center. Thereby, it is also possible to make the shear stress act on the microstructure of the virtual axis of rotation region, and make the whole of microstructure fine uniformly.

In the method of working a metal according to yet another aspect of the invention, one non-low deformation resistance region is caused to displace relative to another non-low deformation resistance region along the direction approximately orthogonal to the extending direction of aforesaid metal body. Thereby, it is also possible to make the shear stress act on the microstructure of the virtual axis of rotation region, and the whole microstructure fine uniformly.

In the method of working a metal according to yet another aspect of the invention, wherein a compression stress is acted on said low deformation resistance regions along the extending direction of the said metal body. Thereby, the deformation such as humps in the metal body, due to the shear deformation applied to the low deformation resistance region, is prevented, thereby it is possible to maintain the shape of the metal body, and make the microstructure fine as well.

In the method of working a metal according to yet another aspect of the invention, wherein said low deformation resistance regions are formed by heating said metal body by the heating mechanism provided between a first cooling mechanism and a second cooling mechanism. Thereby, it is possible to adjust the width of the low deformation resistance region by the first cooling mechanism and the second cooling mechanism, and the shear stress due to the shear deformation applied to the low deformation resistance region, can be increased by reducing the width of the low deformation resistance region, thus the microstructure is rendered fine effectively.

In the method of working a metal according to yet another aspect of the invention, wherein said metal body is a plate body. Thereby, it is very easy to produce a plate-like metal with the grain refinement, which is difficult to be produced by prior ECAP method.

In the method of working a metal according to yet another aspect of the invention, wherein said metal body is a plate body laminated with different metal layers. Thereby, it is very easy to produce a plate-like metal with the grain refinement, which is difficult to be produced by prior ECAP method, and form an alloy with different composition in the laminated direction.

In the method of working a metal according to yet another aspect of the invention, wherein aforesaid metal body is a plate body made from a mixing material including a first metal and a second metal. Thereby, it is possible to form an alloy in which the first metal and the second metal fixedly join together, and it is easy to form a alloy that the various prior methods of the metal alloy manufacturing are difficult to form.

In the method of working a metal according to yet another aspect of the invention, wherein aforesaid metal body is a hollow cylinder. Thereby, it is very easy to produce a hollow cylinder-like metal with the grain refinement, which is difficult to be produced by prior ECAP method.

In the method of working a metal according to yet another aspect of the invention, wherein aforesaid metal body is a hollow cylinder laminated with different metal layers. Thereby, it is very easy to produce a hollow cylinder-like metal with the grain refinement, which is difficult to be produced by prior ECAP method, and form a hollow-cylinder alloy with different composition in the laminated direction.

In the method of working a metal according to yet another aspect of the invention, wherein aforesaid metal body is a hollow cylinder made from a mixing material including a first metal and a second metal. Thereby, it is possible to form an alloy in which the first metal and the second metal fixedly join together, and it is easy to form an alloy, which the prior manufacturing methods of fusing the alloy with different metals are difficult to form.

In the method of working a metal according to yet another aspect of the invention, wherein aforesaid metal body is a hollow cylinder and become a plate body by cutting the circumference of the hollow cylinder after aforesaid position change. Thereby, it is very easy to produce a hollow cylinder-like metal with the grain refinement, which is difficult to be produced by prior ECAP method.

In the method of working a metal according to yet another aspect of the invention, wherein aforesaid metal body is a hollow cylinder laminated with different metal layers and become a plate body by cutting the circumference of the hollow cylinder after aforesaid position change. Thus, it is very easy to produce a hollow cylinder-like metal with the grain refinement, which is difficult to be produced by prior ECAP method, and form an alloy with different composition in the laminated direction.

In the method of working a metal according to yet another aspect of the invention, wherein aforesaid metal body is a hollow cylinder made from a mixing material including a first metal and a second material and become a plate body by cutting the circumference of the hollow cylinder after aforesaid position change. Thus, it is possible to form an alloy in which the first metal and the second metal fixedly join together, and it is easy to form an alloy, which the prior manufacturing methods of fusing the alloy with different metals are difficult to form.

In the method of working a metal according to yet another aspect of the invention, wherein aforesaid metal body is a bar. Thus, it is very easy to produce a rod-like metal with the grain refinement, which is difficult to be produced by prior ECAP method.

In the method of working a metal according to yet another aspect of the invention, wherein aforesaid metal body is a bar laminated with different metal layers. Thus, it is very easy to produce a rod-like metal with the grain refinement, which is difficult to be produced by prior ECAP method, and form a clubbed alloy with different composition in the laminated direction.

In the method of working a metal according to yet another aspect of the invention, wherein aforesaid metal body is a bar made from a mixing material including a first metal and a second metal. Thus, it is possible to form an alloy in which the first metal and the second metal fixedly join together, and it is easy to form an alloy, which the prior manufacturing methods of fusing the alloy with different metals are difficult to form.

In the method of working a metal according to yet another aspect of the invention, wherein aforesaid metal body is a bar made by at least bundling a first metal wire and a second metal wire together. Thus, it is possible to form an alloying in which the first metal in addition the second metal fixedly join together, in addition, it is easy to form an alloy, which the prior manufacturing methods of fusing the alloy with different metals are difficult to form.

In the method of working a metal according to yet another aspect of the invention, it comprises the following steps: locally reducing the deformation resistance of the metal body extending in one direction; forming a first low deformation resistance region and a second low deformation resistance region crossing the metal body with a preset interval; and making said first low deformation resistance region and said second low deformation resistance region shear deformation, thereby making the microstructure of the metal body fine. Thereby, the mechanism for making the first low deformation resistance region and the second low deformation resistance region subject to shear deformation, respectively, is simplified, thus in the process of continuously manufacturing the metal, the microstructure can be made fine by providing the first low deformation resistance region and the second low deformation resistance regions.

In the method of working a metal according to yet another aspect of the invention, wherein the non-low deformation resistance region sandwiched between said first low deformation resistance region and said second low deformation resistance region is caused to vibrate along the direction approximately orthogonal to the extending direction of said metal body. Thereby, the shear deformation is very easy to be generated in the first low deformation resistance region and the second low deformation resistance region.

In the method of working a metal according to yet another aspect of the invention, wherein the non-low deformation resistance region sandwiched between said first low deformation resistance region and said second low deformation resistance region is caused to vibrate along a first direction approximately orthogonal to the extending direction of said metal body, and vibrate simultaneously along a second direction approximately orthogonal to the extending direction of the metal body and the first direction, respectively. Thus, the shear deformation is very easy to be generated in the first low deformation resistance region and the second low deformation resistance region, at the same time, the large shear stress may act on the first and the second low deformation resistance regions.

In the method of working a metal according to yet another aspect of the invention, wherein the non-low deformation resistance region sandwiched between said first low deformation resistance region reach said second low deformation resistance region is caused to rotate about a virtual axis of rotation approximately parallel to the extending direction of said metal body. Thereby, the shear deformation is very easy to be generated in the first low deformation resistance region and the second low deformation resistance region.

In the method of working a metal according to yet another aspect of the invention, said the first low deformation resistance region and said the second low deformation resistance region are formed by heating up to different temperatures, respectively. Thereby, it is possible to make the shear stresses generated in the first low deformation resistance region and the second low deformation resistance region different. Especially, in the case where the metal body is caused to move along the extending direction, the different shear stresses will act on the body in sequence, thus the microstructure is further rendered fine; therefore the effect of further improving the strength or ductility of the metal body is obtained.

In the metal body according to yet another aspect of the invention, a low deformation resistance region is formed by locally reducing the deformation resistance temporarily, and microstructure with refinement grain is obtained by making the low deformation resistance region shear deformation. Thereby, it is possible to make the microstructure of the locally formed low deformation resistance region fine, and it is easy to form a metal body with high strength or high ductility with low price.

In the metal body according to yet another aspect of the invention, the said shear deformation occurs in the whole of said low deformation resistance region. Thus, it is possible to provide the metal body in which the microstructure of the whole low deformation resistance region is rendered fine uniformly.

In the metal body according to yet another aspect of the invention, said shear deformation occurs in the portion of said low deformation resistance region. Thus, the shear deformation occurs in a portion of the low deformation resistance region, therefore, it is possible to make the microstructure of this portion remarkably fine to provide a metal body with improved strength or ductility.

In metal body according to yet another aspect of the invention, it extends in one direction, wherein a low deformation resistance region crossing the metal body is formed by locally reducing the deformation resistance temporarily, a shear deformation occurs in the low deformation resistance region thereby to make the microstructure of the metal body fine. Thereby, it is possible to make the microstructure of the locally formed low deformation resistance region fine, and it is easy to form a metal body with high strength or high ductility with low price.

In the metal body according to yet another aspect of the invention, said shear deformation occurs in the center of said low deformation resistance region. Thereby, in the locally formed low deformation resistance region, it is possible to make the microstructure of the center of the low deformation resistance region having a minimal deformation resistance fine, thereby to provide a metal body with improved strength or ductility.

In the metal body according to yet another aspect of the invention, wherein said shear deformation occurs at both ends of said low deformation resistance region. Therefore, the non-low deformation resistance region with high resistance can withstand the shear deformation much more than the low deformation resistance region, thus the large shear stress can act on the both ends of the low deformation resistance region, and it is possible to make the microstructure effectively fine thereby to provide a metal body with improved strength or ductility.

In the metal body according to yet another aspect of the invention, said shear deformation occurs at one end of said low deformation resistance region. Therefore, the non-low deformation resistance region with high resistance can withstand the shear deformation much more than the low deformation resistance region, thus the large shear stress can act on one end of the low deformation resistance region, and it is possible to make the microstructure effectively fine thereby to provide a metal body with improved strength or ductility.

In the metal body according to yet another aspect of the invention, said low deformation resistance region is made to displace along the extending direction of the said metal body. Thereby, it is very easy to make the microstructure of the whole metal body fine in one direction, and in addition, to continuously provide the metal body with the grain refinement microstructure.

In the metal body according to yet another aspect of the invention, extending in one direction, a low deformation resistance region crossing the metal body is formed by locally reducing the deformation resistance temporarily, which is sandwiched by non-low deformation resistance regions, one of the non-low deformation resistance region is caused to displace relative to the other non-low deformation resistance region, thus a shear deformation occurs in the low deformation resistance region, thereby the microstructure of metal body is rendered fine. Therefore, it is possible to make the microstructure of the locally formed low deformation resistance region fine, and it is easy to form a metal body with high strength or high ductility with low price.

In the metal body according to yet another aspect of the invention, said displacement is caused by a vibration applied to said metal body in the direction approximately orthogonal to the extending direction of said metal body. Thereby, the shear deformation is very easy to be generated in the low deformation resistance region, and the metal body with the grain refinement microstructure can be provided.

In the metal body according to yet another aspect of the invention, said displacement is caused by a compound motion comprising a first vibration along a first direction approximately orthogonal to the extending direction of said metal body, and a second vibration along a second direction approximately orthogonal to said first direction and the said extending direction of the metal body. Thereby, the shear deformation is very easy to be generated in the low deformation resistance region, at the same time, it is possible to apply a large shear stress so as to provide the metal body with the grain refinement microstructure.

In the metal body according to yet another aspect of the invention, said displacement is caused by a twisting motion about the virtual axis of rotation approximately parallel to the extending direction of said metal body. Thereby, the shear deformation is very easy to be generated in the low deformation resistance region, and the metal body with the grain refinement microstructure can be provided.

In the metal body according to yet another aspect of the invention, said low deformation resistance region is formed by heating said metal body by means of heating mechanism, and said heating mechanism provides a heating distribution without taking said virtual axis of rotation region as center. Thereby, it is also possible to make the shear stress act on the region near the virtual axis of rotation of metal body, and provide the metal body in which the whole microstructure is rendered fine uniformly.

In the metal body according to yet another aspect of the invention, one said non-low deformation resistance region is caused to displace relative to another said non-low deformation resistance region along the direction approximately orthogonal to the extending direction of said metal body. Thereby, it is also possible to make the shear stress act on the region near the virtual axis of rotation of metal body, and accordingly, provide the metal body in which the whole microstructure is rendered fine uniformly.

In the metal body according to yet another aspect of the invention, a compression stress is caused to act on non-low deformation resistance region along the extending direction of the said metal body. Thereby, the deformation such as humps in the metal body due to the shear deformation applied to the low deformation resistance region, is prevented, thereby it is possible to maintain the shape of the metal body, and provide a metal body with the grain refinement microstructure.

In the metal body according to yet another aspect of the invention, said non-low deformation resistance region is formed by heating said metal body by means of the heating mechanism provided between a first cooling mechanism and a second cooling mechanism. Thereby, it is possible to adjust the width of the low deformation resistance region by the first cooling mechanism and the second cooling mechanism, and the shear stress due to the shear deformation applied to the low deformation resistance region, can be increased by reducing the width of the low deformation resistance region, thus the metal body is rendered fine effectively.

In the metal body according to yet another aspect of the invention, said metal body is a plate shape. Thereby, it is very easy to produce a plate-like metal with the grain refinement microstructure, which is difficult to be produced by prior ECAP method.

In the metal body according to yet another aspect of the invention, wherein aforesaid metal body is a plate body laminated with different metal layers. Thereby, it is very easy to produce a plate-like metal with the grain refinement microstructure, which is difficult to be produced by prior ECAP method, at the same time, to provide an alloy with different composition in the laminated direction.

In the metal body according to yet another aspect of the invention, wherein aforesaid metal body is a plate body made from a mixing material including a first metal and a second metal. Thereby, it is possible to form an alloy in which the first metal and the second metal fixedly join together, and it is easy to form an alloy, which the prior manufacturing methods of fusing the alloy with different metals are difficult to form.

In the metal body according to yet another aspect of the invention, wherein aforesaid metal body is a hollow cylinder. Thereby, it is very easy to produce a hollow metal body with the grain refinement microstructure, which is difficult to be produced by prior ECAP method.

In the metal body according to yet another aspect of the invention, wherein aforesaid metal body is a hollow cylinder laminated with different metal layers. Thereby, it is very easy to produce a hollow metal body with the grain refinement microstructure, which is difficult to be produced by prior ECAP method, and provide a hollow-cylinder alloy with different composition in the laminated direction.

In the metal body according to yet another aspect of the invention, wherein aforesaid metal body is a hollow cylinder made from a mixing material including a first metal and a second metal. Thereby, it is possible to form an alloy in which the first metal and the second metal fixedly join together, and it is easy to form an alloy, which the prior manufacturing methods of fusing the alloy with different metals are difficult to form.

In the metal body according to yet another aspect of the invention, wherein aforesaid metal body is a hollow cylinder and become a plate body by cutting the circumference of the hollow cylinder after one non-low deformation resistance region has a position change relative to another non-low deformation resistance region. Thereby, it is possible to provide a plate metal body with the grain refinement microstructure, which is difficult to be produced by prior ECAP method.

In the metal body according to yet another aspect of the invention, wherein aforesaid metal body is a hollow cylinder laminated with different metal layers and become a plate body by cutting the circumference of the hollow cylinder after aforesaid position change. Thereby, it is very easy to produce a plate metal body with the grain refinement microstructure, which is difficult to be produced by prior ECAP method, in addition, provide an alloy with different composition in the laminated direction.

In the metal body according to yet another aspect of the invention, wherein aforesaid metal body is a hollow cylinder made from a mixing material including a first metal and a second material and become a plate body by cutting the circumference of the hollow cylinder after aforesaid position change. Thereby, it is possible to form an alloy in which the first metal and the second metal fixedly join together, and it is easy to form an alloy, which the prior manufacturing methods of fusing the alloy with different metals are difficult to form.

In the metal body according to yet another aspect of the invention, wherein aforesaid metal body is a bar. Thereby, it is very easy to produce a rod-like metal body with the grain refinement microstructure, which is difficult to be produced by prior ECAP method.

In the metal body according to yet another aspect of the invention, wherein aforesaid metal body is a bar laminated with different metal layers. Thereby, it is very easy to produce a rod-like metal body with the grain refinement microstructure, which is difficult to be produced by prior ECAP method, in addition, provide a clubbed alloy with different composition in the laminated direction.

In the metal body according to yet another aspect of the invention, wherein aforesaid metal body is a bar made from a mixing material including a first metal and a second metal. Thereby, it is possible to form an alloy in which the first metal and the second metal fixedly join together, and it is easy to form an alloy, which the prior manufacturing methods of fusing the alloy with different metals are difficult to form.

In the metal body according to yet another aspect of the invention, wherein aforesaid metal body is a bar made by at least bundling a first metal wire and the second metal wire together. Thereby, it is possible to form an alloy in which the first metal and the second metal fixedly join together, in addition it is easy to form an alloy, which the prior manufacturing methods of fusing the alloy with different metals are difficult to form.

In the metal body according to yet another aspect of the invention, which extends in one direction, a first low deformation resistance region and a second low deformation resistance region crossing the metal body with a preset interval are formed by locally reducing the deformation resistance temporarily forms, and the microstructure of the metal body with grain refinement is obtained by making said first low deformation resistance region and said second low deformation resistance region suffer to shear deformation. Thereby, the mechanism is simplified, which makes the first low deformation resistance region and the second low deformation resistance region subjected to shear deformation, respectively. Thus during the process of continuously processing the metal, the microstructure is made fine by providing the first low deformation resistance region and the second low deformation resistance region, accordingly, the metal body with such microstructure can be provided.

In the metal body according to yet another aspect of the invention, a non-low deformation resistance region sandwiched between said first low deformation resistance region and said second low deformation resistance region is caused to vibrate along the direction approximately orthogonal to the extending direction of said metal body. Thereby, the shear deformation is very easy to be generated in the first low deformation resistance region and the second low deformation resistance region, the metal body with the grain refinement microstructure can be provided.

In the metal body according to yet another aspect of the invention, a non-low deformation resistance region sandwiched between said first low deformation resistance region and said second low deformation resistance region is caused to vibrate along a first direction approximately orthogonal to the extending direction of said metal body, at the same time vibrate along a second direction approximately orthogonal to the extending direction of the metal body and the first direction. Thereby, the shear deformation is very easy to be generated in the first low deformation resistance region and the second low deformation resistance region, and it is possible to the metal body in which a large shear stress is applied to make the microstructure fine.

In the metal body according to yet another aspect of the invention, a non-low deformation resistance region sandwiched between said first low deformation resistance region reach said second low deformation resistance region is caused to rotate about a virtual axis of rotation approximately parallel to the extending direction of said metal body. Thereby, the shear deformation is very easy to be generated in the first low deformation resistance region and the second low deformation resistance region, the metal body with the grain refinement microstructure can be provided.

In the metal body according to yet another aspect of the invention, said the first low deformation resistance region and said the second low deformation resistance region are formed by heating up to different temperatures, respectively. Thereby, it is possible to make the shear stresses generated in the first low deformation resistance region and the second low deformation resistance region different. Especially, in the case where the metal body is caused to move along the extending direction, the different shear stresses will act on the metal body in sequence, thus the microstructure is further rendered fine; therefore the metal body with further improved strength or ductility is provided.

In the metal body according to yet another aspect of the invention, wherein aforesaid metal body is a vehicle part. Thereby, the weight of vehicles using the vehicle part can be reduced, and it is of benefit to reducing the fuel consumption.

In the metal body according to yet another aspect of the invention, said metal body is any one of the following: Sputter target material, magnetic body, shape memory alloy, metal hydride, vibration damping alloy, electrothermal material, biological material, ship parts, aircraft components, parts of the load-carrying equipments except vehicles, building construction members. Thereby, it is possible to improve the processing property of these products, and in the case of a large volume part, the weight thereof can be reduced, especially, when it is used for sputter target material, the more uniform metal film can be formed.

In the metal-containing body according to yet another aspect of the invention, which extends in one direction, a low deformation resistance region crossing the metal-containing body is formed by locally reducing the deformation resistance temporarily, which is sandwiched by non-low deformation resistance regions, one of the non-low deformation resistance region is caused to displace relative to the other non-low deformation resistance region, thus a shear deformation occurs in the low deformation resistance region, thereby the microstructure of metal body is rendered fine. Thereby, it is possible to provide a metal-containing ceramic body in which the metal components and the non-metal components are firmly and uniformly joined.

In the metal body according to yet another aspect of the invention, wherein said displacement is caused by a twisting motion applied to the metal-containing body about a virtual axis of rotation approximately parallel to the said extending direction of the metal-containing body. Thereby, it is also possible to make the shear stress act on the region about the virtual axis of rotation of the metal-containing body, and therefore, a metal-containing ceramic body in which the metal components and the non-metal components are firmly and uniformly joined.

DETAILED DESCRIPTION OF THE INVENTION

Figure 1:
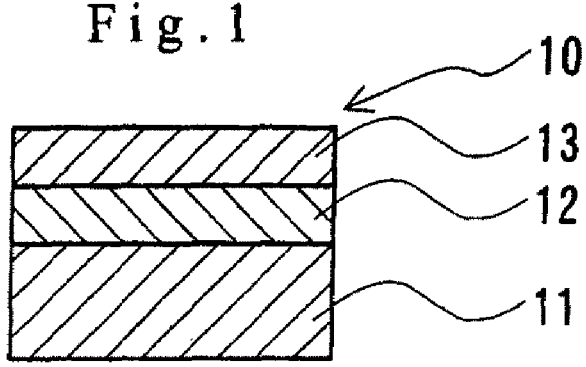
FIG. 1 is a schematic section of a metal body.

According to the present invention, in the metal working method, the metal body produced by such method, the metal-containing ceramic body produced by such method and the sputter target material produced by such method, the microstructure of the body is rendered fine to thereby enhance the strength, or ductility, and especially in the case of the metal-containing ceramic body, to enhance the homogeneity thereof.

In the metal body or metal-containing ceramic body, the body is deformed partly to reduce the deformation resistance, thus to obtain low deformation resistance regions, and the intensity strain is obtained by making the low deformation resistance regions get shear deformation partly, so as to make the microstructure fine.

Especially, in the low deformation resistance regions produced partly as above, the shear stress concentration is formed in the low deformation resistance regions due to the shear deformation resulted from fining the microstructure, therefore, it is possible to make the microstructure fine effectively.

The technical term "low deformation resistance regions" herein is referred to the regions which are obtained by heating the metal body or metal-containing ceramic body to reduce the deformation resistance and which are easier to deform under the outside force than other regions. For the purpose of illustration, the other regions are called as non-low deformation resistance regions.

The low deformation resistance regions are obtained not only by heating, but also by mounting some limiting elements surrounding the metal body having preset temperature to obtain the non-low deformation resistance regions, whereas other regions without limit elements are acted as the low deformation resistance regions.

In addition, the metal body is made of one kind of metal, an alloy including two or more kinds of metal, or an intermetallic compound including the metal elements and the non-metal elements. In the case of the intermetallic compound, the intermetallic compound herein is called as metal-containing ceramic in order to make it clear. Hereafter, said metal body includes the metal-containing ceramic except for mentioned particularly.

It is not necessary for the metal body to be made integrally. In the schematic section view of the metal body as shown in the FIG. 1, the laminated body 10 of the metal body is obtained as follows: the second metal layer 12 is laminated to the first metal layer 11, and the third metal layer 13 is laminated to the second metal layer 12. In this case, it is possible if the first metal layer 11, the second metal layer 12, and the third metal layer 13 are the preset metal or the preset metal alloy respectively. The first metal layer 11, the second metal layer 12, and the third metal layer 13 may form the laminated body 13 by laminating, or by plating, coating by vaporization and pressure welding and so on. Herein, the number of the layers of the laminated body 10 is not limited to three, and may be changed if desired.

Figure 2:
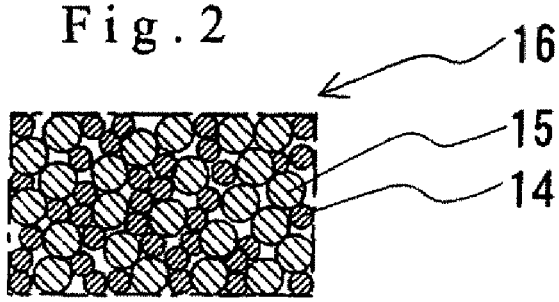
FIG. 2 is a schematic section of a metal body.

Alternatively, in the schematic section view of the metal body of FIG. 2, the metal body may be formed by calcining a compound body mixed by the first metal powder 14 and the second metal powder 15 to get a calcining body 16 in a preset shape. Here, the calcining body 16 may be formed from not only the powder comprising of the first metal powder 14 and the second metal powder 15, but also several kinds of powder; the calcining body 16 may formed from not only metal powder, but also non-metal powder.

Figure 3:
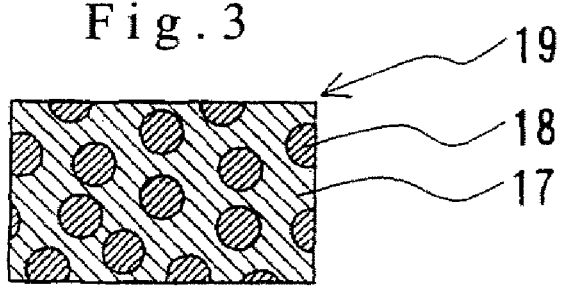
FIG. 3 is a schematic section of a metal body.

As shown in the schematic section view of FIG. 3, alternatively, the metal body may be the filler 19, which is formed by filling the metal powder 18 into the hole part of the porous body 17 in predetermined shape. In addition, the porous body 17 may be filled with not only the metal powder 18, but also the non-metal powder.

Figure 4:
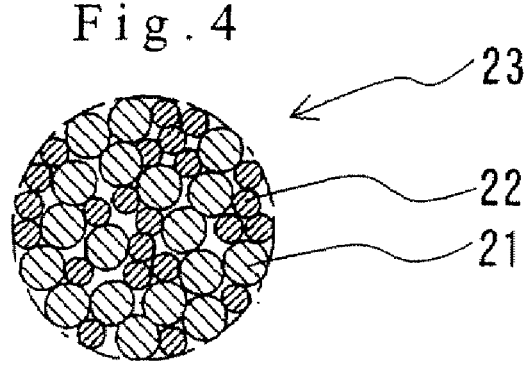
FIG. 4 is a schematic section of a metal body.

Alternatively, in the schematic section view of the metal body of FIG. 4, the metal body may be formed by bundling a plurality of first metal wires 21 and a plurality of second metal wires 22 together to obtain the wire bundle 23. In this case, the metal body may be formed not only by bundling the first metal wires 21 and the second metal wires 22 both together, but also by bundling more metal wires to obtain the wire bundle 23.

As stated above, the metal body may be in any form, as long as the microstructure can be rendered fine by shear deformation stated as follows.

In FIGS. 1 to 3, the cross section of the metal body is a rectangular, and in FIG. 4, the cross section of the metal body is circular. But the metal body is not limited to the cuboid with the rectangular cross section, or the bar with circular cross section, but it may be plate body or tube-like body with hollow, and it may be, for example, H type steel, angle steel, channel steel, T-type steel, corrugated steel and so on.

Figure 5A:
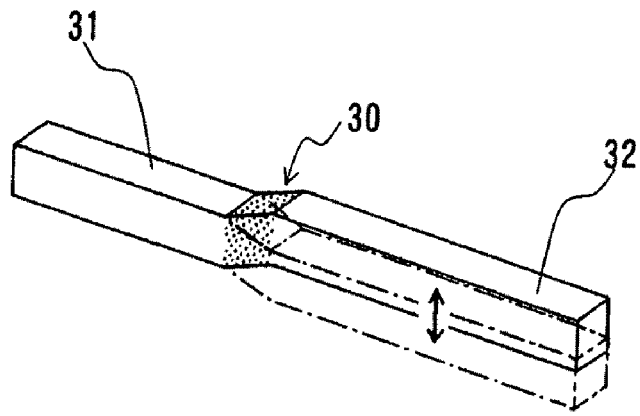
FIG. 5 is explanatory drawing of shear deformation generated in the low resistance region.
Figure 5B:
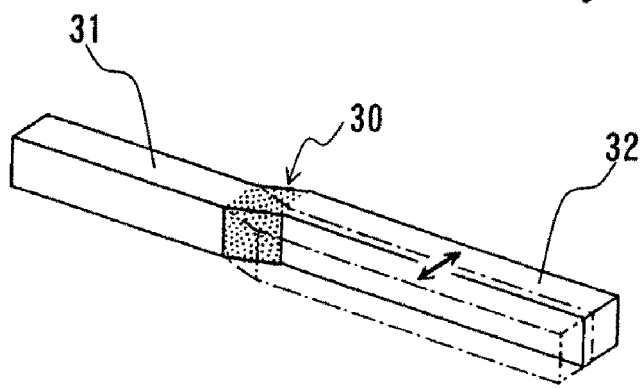
Figure 5C:
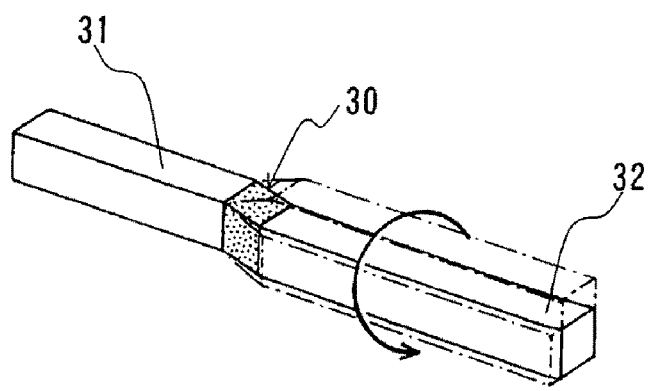

The metal body extends in one direction, as shown in FIG. 5, so as to produce low deformation resistance regions 30 by laterally bending the metal body, thereby obtain a first non-low deformation resistance regions 31 and a second non-low deformation resistance regions 32 spaced by the low deformation resistance region 30.

In this way, the low deformation resistance region 30 is produced by laterally bending the metal body in the extending direction, the low deformation resistance region 30 is caused to move along the direction of extending direction of the metal body, at the same time, the low deformation resistance region 30 is caused to be subjected to shear deformation, thereby it can carry out the fining treatment of the microstructure continuously.

In addition, the multifunction of the metal body can be realized by adjusting the shear deformation state of the low deformation resistance region 30 to produce several regions with different microstructure fining level.

As shown in FIG. 5 (a), the shear deformation of the low deformation resistance region 30 is generated by making the second non-low deformation resistance region 32 to vibrate relative to the first non-low deformation resistance region 31 in the thickness direction of the metal body, or, as shown in FIG. 5 (b), in the width direction orthogonal to the thickness direction of the metal body, instead of in the thickness direction of the metal body. As shown in FIG. 5 (c), the compound vibration may be obtained by combining the vibration in the thickness direction with the vibration in the width direction. If the compound vibration is adopted, a larger shear stress will act on the deformation resistance region.

In addition, when the metal body is a broader plate, it is not necessary to laterally bend the metal body to form the low deformation resistance regions, but the low deformation resistance regions may be formed in the required regions of the metal body. Making the low deformation resistance regions to have shear deformation, to thereby fine the microstructure of a portion of the metal body, can form a high strength or a high ductility region.

Figure 6:
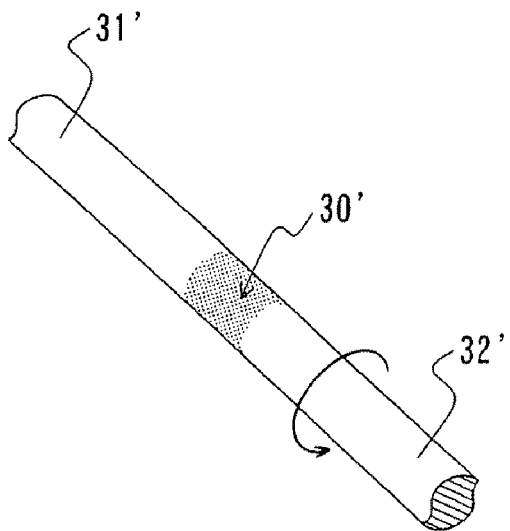
FIG. 6 is explanatory drawing of shear deformation generated in the low resistance region.

Furthermore, when the metal body is round bar or hollow cylinder, as shown in FIG. 6, it is possible to make the second non-low deformation resistance region 32' to twist with respect to the first non-low deformation resistance region 31' about the virtual axis of rotation approximately parallel to the extending direction of the metal body, thus to cause the low deformation resistance region 30' to have shear deformation. In this case, the second non-low deformation resistance region 32' can either always rotate with a predetermined angular velocity relative to the first non-low deformation resistance region 31', or rotate in positive direction and in negative direction alternatively.

The amount of the vibration or twisting motion of the first non-low deformation resistance regions 31, 31' relative to the second non-low deformation resistance regions 32, 32' does not need enough, so as it can cause the low deformation resistance region 30, 30' to produce shear deformation, thereby to cause the microstructure to fine.

When the low deformation resistance regions 30, 30' is caused to be subjected to shear deformation, it is possible to suppress the larger shape deformation produced in the low deformation resistance regions 30, 30', or breaking produced in the portion of the low deformation resistance regions 30, 30', by compression stress acting on the low deformation resistance regions 30, 30 along the extending direction of the metal body.

In this way, by means of the shear deformation in the low deformation resistance region, not only is the microstructure of the low deformation resistance region caused to be fined, but also the microstructure in the whole metal body shown in FIGS. 1 to 4 can be joined together to produce a new alloy or ceramic. Especially, there is an advantage in that it is possible to produce mechanically a new alloy, which cannot be produced by fusion method.

When the low deformation resistance region are caused to have shear deformation as mentioned above, alternatively, as shown in FIG. 7, in the metal body extending along one direction, the first low deformation resistance region 30a and the second low deformation resistance region 30b spaced with a preset interval are produced to make the metal body lateral bend, and the region sandwiched between the first low deformation resistance region 30a and the second low deformation resistance region 30b is called middle non-low deformation resistance region 33. It is very easy to make the first low deformation resistance region 30a and the second low deformation resistance region 30b have shear deformation by the vibration of the middle non-low deformation resistance region 33.

Figure 7A:
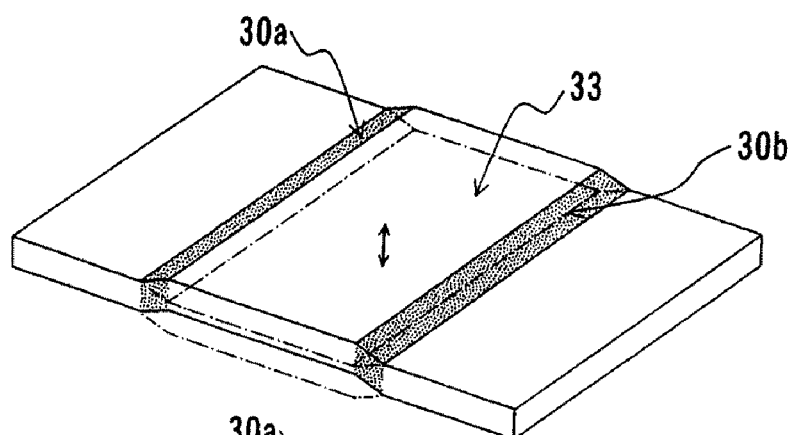
FIG. 7 is explanatory drawing of shear deformation generated in the low resistance region.
Figure 7B:
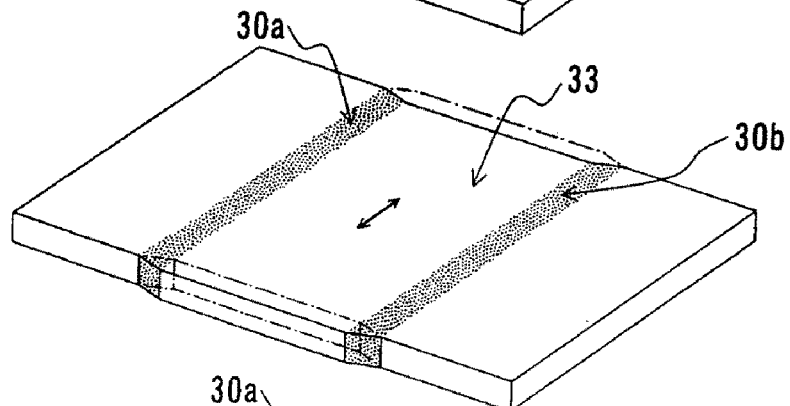
Figure 7C:
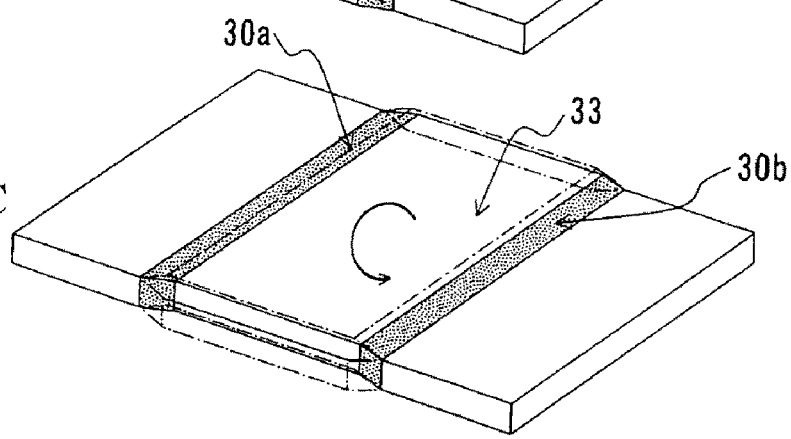

In this case, the metal body in FIG. 7 is a plate. In FIG. 7 (a), the non-low deformation resistance region 33 is caused to vibrate along the thickness direction of the metal body; In FIG. 7(b), the middle non-low deformation resistance region 33 is caused to vibrate along the width direction orthogonal to the thickness direction of the metal body; And, in FIG. 7(c), the middle non-low deformation resistance region 33 is caused to vibrate synthetically by combining the vibration in the thickness direction with the vibration in the width direction.

Figure 8:
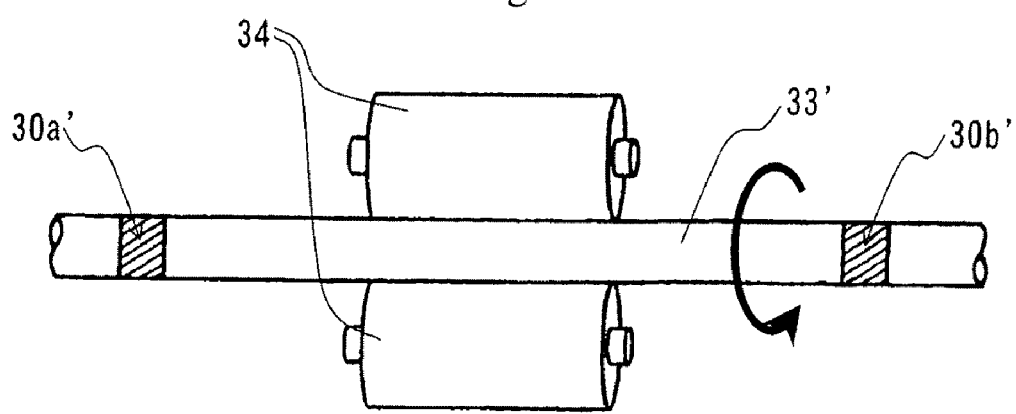
FIG. 8 is explanatory drawing of shear deformation generated in the low resistance region.

When the metal body is a round bar or a hollow cylinder, as shown in FIG. 8, the region, sandwiched between the first non-low deformation resistance region 30a' and the second non-low deformation resistance region 30b' spaced with a preset interval, is caused to rotate about the virtual axis of rotation approximately parallel to the extending direction of the metal body, whereby it is very easy to cause the first low deformation resistance region 30a' and the second low deformation resistance region 30b' to have shear deformation. The reference numeral 34 in FIG. 8 represents a rotation roll for rotating the middle non-low deformation resistance region 33'.

Also in FIGS. 7 and 8, when the metal body moves along the extending direction, the positions of the first low deformation resistance region 30a' and the second low deformation resistance region 30b' of the metal body can change.

As a result, in the continuous manufacturing process of the metal body, the first non-low deformation resistance region 30a' and the second non-low deformation resistance region 30b' are produced in the metal body, and the middle non-low deformation resistance regions 33, 33' are caused to vibrate or rotate, whereby it is very easy to cause the metal body to have shear deformation, thereby the metal body with high strength or high ductility can be produced with low cost by fining the microstructure.

Especially, the first non-low deformation resistance regions 30a, 30a' and the second non-low deformation resistance regions 30b, 30b' are produced by heating the metal body, respectively, and the first non-low deformation resistance regions 30a, 30a' and the second non-low deformation resistance regions 30b, 30b' are heated with different heating temperature, thus the shear stress thereof are different, and the different shear stress is caused to act on the metal body in two stages, therefore, it is possible to further make the microstructure fine.

Additionally, when the portion of the microstructure for grain refinement is subjected to shear deformation again after once shear deformation, the heating temperature of the metal body can be reduced to thereby make the microstructure fine further.

In addition, not only does the shear stress act on the microstructure in two stages, but also the multi-middle non-low deformation regions 33, 33' are provided along the extending direction of the metal body, and the shear stress is applied in multistage. In particular, in the case of the metal-containing ceramic body, every time, the shear deformation is proceeded with different condition so as to increase the homogeneity.

Embodiments of the present invention will now be described.

Figure 9:
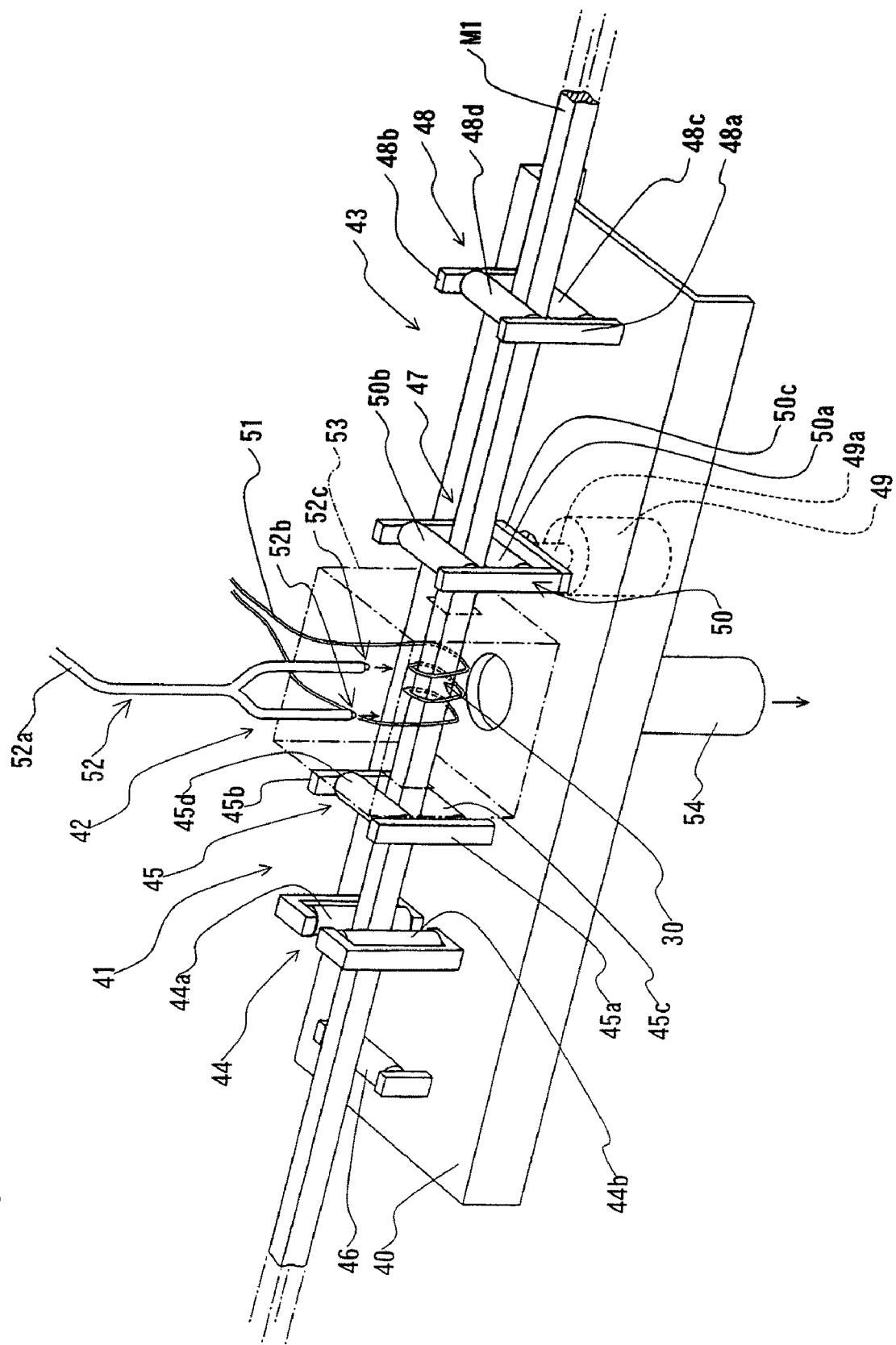
FIG. 9 is a schematic explanatory drawing of SVSP device.

FIG. 9 shows a device for producing the low deformation resistance regions in the metal body by vibrating. The present inventor calls the method, in which the low deformation resistance regions are subjected to shear deformation to thereby fine the microstructure, as SVSP (Severe Vibration Straining Process). FIG. 9 shows a schematic explanatory drawing of one example of SVSP Device. For the sake of explanation, the metal body M1 is supposed to be a square rod body extending in one direction, or it may be other shape.

In SVSP device, a fixing section 41, a shear deformation section 42 and a vibration section 43 are provided on the base 40 along the extending direction of the metal body M1.

The first limiting body 44 and the second limiting body 45 are provided on the fixing section 41 along the extending direction of the metal body M1. The first limiting body 44 limits the metal body M1 fed along the extending direction to move in width direction, and the second limiting body 45 limits the metal body M1 fed along the extending direction to move in thickness direction, so the metal body is held movably forward and backward.

In other words, in the first limiting body 44, the first contact roll 44a and the second contact roll 44b are rotatablely supported by the supporting body 45a respectively to fixedly hold the metal body M1.

Furthermore, a lower roll 45c under the metal body M1 and an upper roll 45d above the metal body M1 are rotatablely mounted between the first supporting body 45a and the second supporting body 45b of the second limiting body 45 for holding the metal body M1, and the rolls 45c, 45d are used to fixedly hold the metal body M1.

In addition, the lower roll 45c and the upper roll 45d may rotate the first contact roll 44a and the second contact roll 44b of the first limiting body 44 by means of a suitable drive unit, thus to act as a feed unit for feeding the metal body M1. The reference numeral 46 in FIG. 9 represents a guide roll for aiding to the feeding of the metal body M1.

A vibration supplier 47 and a vibration propagation suppresser 48 are provided in the vibration section 43 along the extending direction of the metal body M1. The vibration supplier 47 provides the metal body M1 with preset vibration, and the vibration propagation suppresser 48 serves to suppress the propagation of the vibration along the metal body M1.

The vibration supplier 47 comprises an ultrasonic vibrating body 49 under the metal body M1 and a transmitting unit 50 mounted on the output shaft 49a of the ultrasonic vibrating body 49. The transmitting unit 50 comprises a lower roll 50a under the metal body M1 and an upper roll 50b above the metal body M1 mounted on the U-shape supporting bracket 50c, and the metal body M1 is held by the lower roll 50a and the upper roll 50b.

In addition, the transmitting unit 50 vibrates up and down with preset amplitude and preset frequency by the ultrasonic vibrating body 49, thus to make the metal body M1 vibrate up and down. In the present embodiment, the vibration can be generated either by the ultrasonic vibrating body 49 or by some devices other than the ultrasonic vibrating body 49, such as a linear motor or a piezoelectric element etc.

The vibration amplitude supplied to the metal body M1 by the ultrasonic vibrating body 49 does not need to be so large, so as it can cause the microstructure of the low deformation resistance region 30 in the metal body M1 to fine by use of shear deformation. Basically, the minimal required amplitude depends on the grain diameter of the microstructure of the metal body M1 and the width of low deformation resistance region 30 in the extending direction of the metal body M1.

The larger amplitude which is generated by the ultrasonic vibrating body 49 is, the more the microstructure is rendered fine, but in the case of the larger amplitude, the deformation may be difficult to recover in the low deformation resistance region 30, accordingly, it is preferable to use the maximal amplitude, which can not cause the unrecovered deformation (plastic deformation), to make the metal body M1 vibrate.

The so-called non-recovered deformation herein is such deformation in which the low deformation resistance region 30 can recover its original shape before the vibration in a half cycle of vibration. And the so-called unrecovered deformation herein is such deformation in which the low deformation resistance region 30 unable to recover its original shape before vibration in a half cycle of vibration.

The vibration frequency supplied to the metal body M1 by the ultrasonic vibrating body 49 is required as follows: before having the strain, due to the displacement generated in the low deformation resistance region 30 by the vibration, is compensated by the strain generated in the metal body M1, or by the recrystallization of the microstructure, the frequency can cause the displacement other than the previous displacement, that is, the displacement in negative direction or in different direction, to thereby cause strain. The frequency is set as large as possible. In addition, the vibration supplied to the metal body M1 is not necessarily a high-frequency vibration, but it may be, for example, frequency in which the time of the low frequency vibration is relatively shorter merely, just like the half cycle of vibration supplied to the low deformation resistance region 30.

The so-called lower frequency herein is the vibration frequency which uses the following duration as ¼ period, said duration is, during the time before the compensate effect of said metal body M1 or the recrystallization effect of the microstructure begins to effect on the strain generated from the displacement in the low deformation resistance region 30, the maximum duration that the low frequency vibration can generate the strain due to the next displacement.

The vibration propagation suppresser 48 has the same structure as the said the second limiting body 45. A lower roll 48c under the metal body M1 and an upper roll 48d above the metal body M1 are rotatablely mounted between the first supporting body 48a and the second supporting body 48b for holding the metal body M1, and the rolls 48c, 48d are used to fixedly hold the metal body M1. The vibration propagation suppresser suppresses the vibration supplied to the metal body M1 by vibration supplier 47, thus not to propagate along the metal body M1.

The shear deformation section 42 comprises a heating unit 51 for heating the metal body M1 to a preset temperature and cooling unit 52. The cooling unit 52 cools the metal body M1 in order to make the low deformation resistance regions, which are produced by the heating of the heating unit 51 in the metal body M1, be within preset temperature range.

In the present embodiment, the heating unit 51 comprises a high frequency heating coil which winds around the metal body M1 with preset number of turns. Heating the metal body M1 to a preset temperature to reduce the deformation resistance produces the low deformation resistance region 30. In addition, the heating unit 51 is not limited to the high frequency heating coil, or it may use electron beam, plasma, laser, electromagnetic induction etc to heat, or use gasses burner to heat, or use electricity short circuit to heat. Especially, when the electron beam is used as heating unit 51, it is possible to make the width of the low deformation resistance region 30 in the extending direction of the metal body M1 very small, and make the larger shear stress act on the low deformation resistance region 30, accordingly, it is possible to make the microstructure fine further.

The cooling unit 52 comprises a first water outlet 52b and a second water outlet 52c for discharging the water from the water supply pipe 52a, and the water discharging from the first water outlet 52b and the second water outlet 52c cools the metal body M1. The reference numeral 53 in figures represents a water receptacle for water discharging from the first water outlet 52b and the second water outlet 52c. And reference numeral 54 represents the discharge pipe connecting with the water receptacle 53.

In the cooling unit 52, the water discharging from the first water outlet 52b and the second water outlet 52c cools the two sides of the low deformation resistance region 30 which is produced by the heating unit 51 provided between the first water outlet 52b and the second water outlet 52c. Especially, by adjusting the arrangement of the first water outlet 52b and the second water outlet 52c, the low deformation resistance region 30 can be caused to be a much smaller region than the length of the metal body M1 in its extending direction.

In this way, by making the width of the low deformation resistance region 30 much smaller along the extending direction of the metal body M1, it is easy to form severe shear deformation to thereby increase the efficiency of fining the microstructure. And it is possible to decrease the residual strain or residual deformation resulted from the vibration.

Furthermore, the cooling unit 52 can cool the low deformation resistance region 30 heated by the heating unit 51 quickly to proceed quenching, thereby to increase the hardness of the metal body M1 in which the microstructure has been fined.

The metal body M1 is cooled by not only water, but also air or excitation, so long as the means can increase the deformation resistance of the metal body M1.

In the present embodiment, while the cooling unit 52 is provided between the second limiting body 45 and the heating unit 51 comprising the high frequency heating coil, and the cooling unit 52 is also provided between the heating unit 51 and vibration supplier 47, the second limiting body 45 and the vibration supplier body 47 can be provided closer to the heating unit 51 than the cooling unit 52, and the interval between the second limiting body 45 and the vibration supplier 47 is made to short as far as possible.

In this way, by making the interval between the second limiting body 45 and the vibration supplier 47 short as far as possible, it is possible to prevent the vibration energy supplied by the vibration supplier 47 from dissipating to the regions other than the low deformation resistance region 30. It is effective to form the shear deformation of the low deformation resistance region 30 because of the vibration. Moreover, the cooling function may be additionally provided in the lower roll 45c and the upper roll 45d of the second limiting body 45 for holding the metal body M1, and the lower roll 50a and the upper roll 50b of the transmitting unit 50 of the vibration supplier 47 as well.

In the SVSP device constructed as aforementioned, when the microstructure is caused to fine by the vibration, the metal M1 is fed through the fixing section 41, the shear deformation section 42, a vibration section 43 orderly. The cooling unit 52 cools the low deformation resistance region 30 of the metal body M1 passing through the shear deformation section 42, at the same time, the heating unit 51 heats the metal body M1, and the low deformation resistance region 30 is produced, In this case, the heating of the heating unit 51 proceeds until the temperature of the low deformation resistance region 30 is higher than the recovery softening temperature of the strain produced in the metal body M1, and the recrystallization temperature of the microstructure. Once the recovery or recrystallization temperature is got, the shear deformation will produce in the low deformation resistance region 30 by making the non-low deformation resistance region of the metal body M1 vibrate by means of the vibration supplier. In addition, the heat temperature of the metal body M1 obtained by the heating unit 51 is higher than the recovery or recrystallization temperature, but it is preferred that it is controlled to be lower than the temperature beginning to influence the grain refinement of the microstructure.

In this way, by making the low deformation resistance region 30 produce shear deformation, the outer shape of the metal M1 will hardly change, so the microstructure is rendered fine.

Also in the present embodiment, the vibration supplier 47 makes the non-low deformation resistance region of the metal body M1 vibrate along the thickness direction of the metal body M1, that is, up and down, or, as shown in FIG. 2, along the width direction of the metal body M1, that is right and left direction, and the vibration may be the compound vibration performed by combining the vibration along the up and down direction and the vibration along the right and left direction, accordingly, the vibration supplier 47 can be constructed properly.

In this way, the vibration supplied to the metal body M1 is not limited to the vibration in up and down direction or the right and left direction approximately orthogonal to the extending direction of the metal body M1, so long as the vibration involves the vibration components in up and down direction or the right and left direction approximately orthogonal to the extending direction of the metal body M1.

In the SVSP device of the present embodiment, as stated above, the shear deformation is generated in the low deformation resistance region 30 by the vibration supplied by the vibration section 43. While the metal body M1 is fed along the extending direction, the position of the low deformation resistance region 30 of the metal body M1 is shifted. The metal body M1 is treated continuously by the vibration to thereby make the microstructure more fine within a large range.

Especially, the metal body M1 extending in one direction is traversed by the low deformation resistance region 30, thereby the metal body M1 can be conducted uniformly shear treatment, and it is possible to make the microstructure of metal body M1 fine uniformly.

Furthermore, according to circumstances, the magnitude of the shear stress resulted from the shear deformation in the required position of the metal body M1 could be adjusted, thus it is possible to adjust the fineness of the microstructure, and to adjust the strength or ductility of the metal body M1. Therefore, the metal body M1 with partly increased strength or ductility can be produced.

Moreover, when the SVSP device is provided in the last process of the forming apparatus for performing hot rolling, cold rolling or extrusion forming, it is possible to employ the rolling treatment or extrusion treatment etc to make the metal body M1 drawn in the extending direction produce shear deformation, to thereby make the microstructure fine easily.

Figure 10:
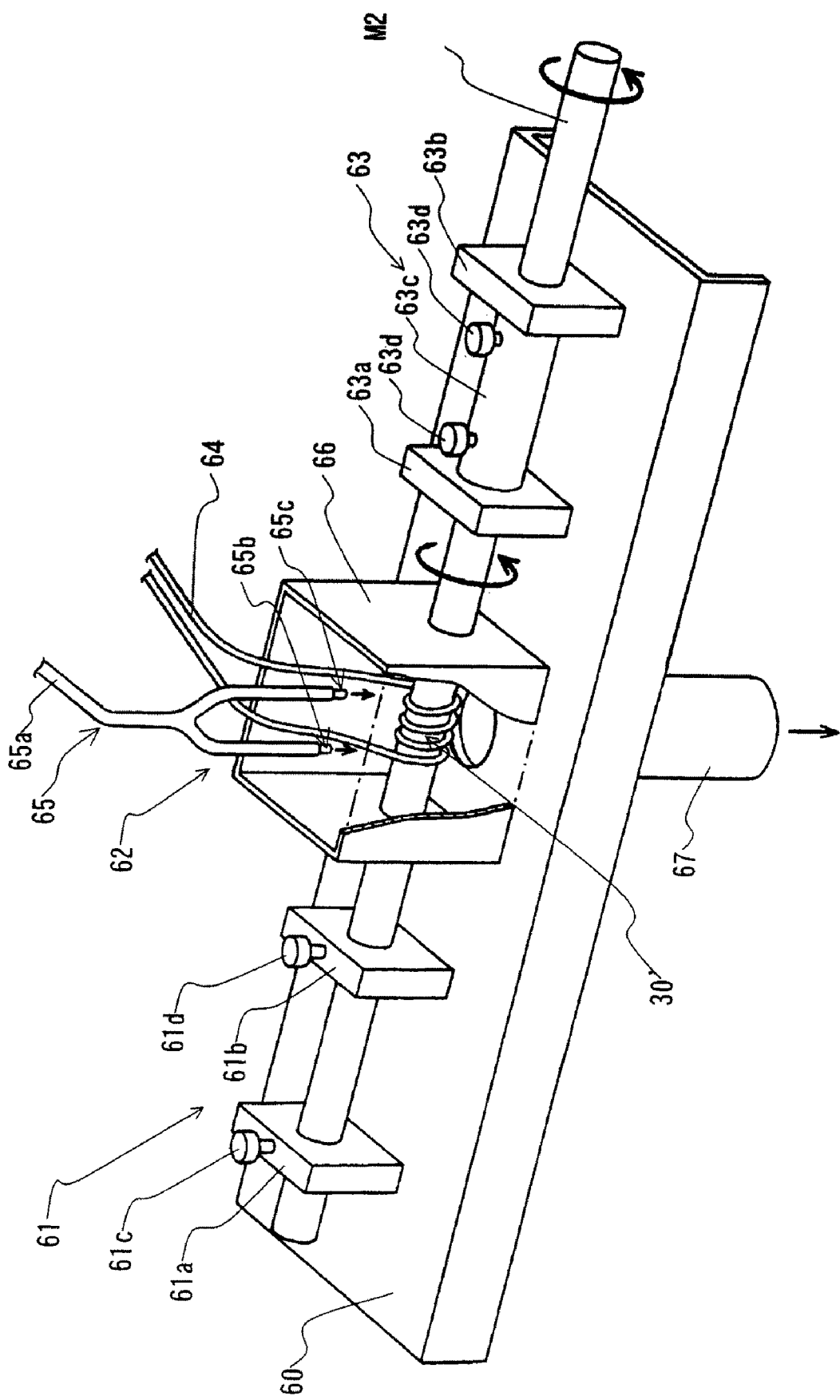
FIG. 10 is a schematic explanatory drawing of one example of STSP device.

FIG. 10 shows a device for making the low deformation resistance region in the metal body produce shear deformation by twisting the body. The present inventor call this method, by which the low deformation resistance region is made to produce shear deformation to fine the microstructure, as [STSP] (Severe Torsion Straining Process). FIG. 10 shows a schematic explanatory drawing of one example of STSP device. In the present description, for the sake of explanation, the metal body M2 is supposed to be a round bar extending in one direction, or it may be a hollow cylinder body.

The STSP device is so designed that a fixing section 61, a shear deformation section 62 and a rotation section 63 are provided on the upper surface of the base 60 along the extending direction of the metal body M2.

The fixing section 61 comprises a first fixing wall 61a and a second fixing wall 61b provided vertically on the upper surface of the base 60, respectively. The fixing section 61a and the second fixing wall 61b are made from a plate body with preset thickness, respectively, and the first fixing wall 61a and the second fixing wall 61b approximately parallel to each other.

Moreover, the first fixing wall 61a and the second fixing wall 61b are provided, respectively, with a hole through which the metal body M2 passes. The fastening screws 61c, 61d are, respectively, provided at the upper end of the first fixing wall 61a and the second fixing wall 61b, and the tip ends of the fastening screws 61c, 61d abut against the circumference of the metal body M2 passing through the holes, thereby to fix the metal body M2.

In addition, the fixing section 61 is not limited to the structure comprising the first fixing wall 61a and the second fixing wall 61b, so long as it can fix the metal body M2. So-called fixing the metal body M2 herein means to prevent the metal body M2 from rotating about the central axis of the metal body M2 in round bar shape.

The rotation section 63 comprises a first limiting wall 63a located vertically on the upper surface of the base, a second limiting wall 63b, an advance and a retreat limiting body 63c sandwiched between the first limiting wall 63a and the second limiting wall 63b, and a rotating device (not shown in figures).

The first limiting wall 63a and the second limiting wall 63b are made from a plate body with preset thickness, respectively, and the first limiting wall 63a and the second limiting wall 63b approximately parallel to each other. Moreover, the first limiting wall 63a and the second limiting wall 63b are provided respectively with a hole through which the metal body M2 passes. The holes are used for passing the metal body M2.

The advance and retreat limiting body 63c has a length which is approximately equal to the interval between the first limiting wall 63a and the second limiting wall 63b, and comprises a cylinder body mounted around the metal body M2. The advance and retreat limiting body 63c is mounted around the metal body M2, and the fastening screws 63d screwed into the advance and retreat limiting body 63c abut against the circumference of the metal body M2 passing through the advance and retreat limiting body 63c, to thereby to fix the advance and retreat limiting body 63c to the metal body M2.

As a result, when the non-low deformation resistance region of the metal body M2 is caused to rotate as described hereafter, it is possible to prevent the translation of the metal body M2 in the extending direction because the advance and retreat limiting body 63c is limited by the first limiting wall 63a and the second limiting wall 63b.

Various devices can be used as the rotating device to make the low deformation resistance region of the metal body M2 rotate, so long as it can supply a preset torque to the metal body M2 on the side of the rotation section 63 and at the same time makes the body M2 rotate. In the present embodiment, the end of the metal body M2 on one side of the rotation section 63 is coupled with a motor acting as a rotating device (not shown).

The shear deformation section 62 comprises a heating unit 64 for heating the metal body M2 to a preset temperature and a cooling unit 65 for cooling the metal body M2 in order to make the low shear deformation resistance region 30', which is produced by the heating of the heating unit 64 in the metal body M2, form a preset width size.

In the present embodiment, the heating unit 64 comprises a high frequency heating coil which winds around the metal body M2 with a preset number of turns. The deformation resistance is reduced by heating the metal body M2 to a preset temperature, thereby, the low deformation resistance region 30' is produced. In addition, the heating unit 64 is not limited to the high frequency heating coil, or it may use electron beam, plasma, laser, electromagnetic induction etc to heat, or use a gasses burner to heat, or use electricity short circuit to heat. Especially, when the electron beam is used as heating unit 64, it is possible to make the width of the low deformation resistance region 30' in the extending direction of the metal body M2 be very small, and make the larger shear stress act on the low deformation resistance region 30', thereby it is possible to make the microstructure even more fine.

The cooling unit 65 comprises a first water outlet 65b and a second water outlet 65c for discharging the water from the water supply pipe 65a, and the water discharging from the first water outlet 65b and the second water outlet 65c cools the metal body M2. The reference numeral 66 in FIG. 10 represents water receptacle for containing the water discharging from the first water outlet 65b and the second water outlet 65c, and the reference numeral 67 represents the discharge pipe connecting with the water receptacle 66.

In the cooling unit 65, the water from the first water outlet 65b and the second water outlet 65c cools the two sides of the low deformation resistance region 30 which is produced by the heating unit 64 provided between the first water outlet 65b and the second water outlet 65c. Especially, the low deformation resistance region 30' can be caused to be a much smaller region than the length of the metal body M2 in its extending direction by adjusting the arrangement of the first water outlet 65b and the second water outlet 65c.

In this way, by making the width of the low deformation resistance region 30' much smaller along the extending direction of the metal body, it is easy to form severe shear deformation in the low deformation resistance region 30' to thereby increase the efficiency of fining the microstructure. In addition, when the low deformation resistance region 30' is twisted by the rotating device, the twist discontinuity of the low deformation resistance region 30' can be prevented. Furthermore, it is possible to decrease the residual strain or residual deformation of the shear deformation in the low deformation resistance region 30' resulted from twist.

Furthermore, the cooling unit 65 can cool the low deformation resistance region 30' heated by the heating unit 64 quickly to proceed quenching, thereby to increase the hardness of the metal body M2 in which the microstructure has been fined.

It is preferred that the width of the low deformation resistance region 30' is three or less times longer than the sectional width of the cross-section orthogonal to the extending direction of the metal body M2. By providing the low deformation resistance region 30' with such conditions, the deformation of the low deformation resistance region 30' following the twist is suppressed to a minimum, at the same time, the larger shear deformation can be produced, thereby the efficiency of fining the microstructure is increased.

The above cooling unit 65 is but not limited to the water-cooling unit, and it may use air or excitation etc, so long as the means can make the region heated by the heating unit 64 be a quenchable region. Especially, when the electron beam is used in the heating unit 64, the cooling can proceed by itself in a vacuum environment.

In the STSP device of the present embodiment and the above SVSP device, the metal bodies M1, M2 are heated by the heating unit 64, 51 in the atmosphere, but the metal bodies M1, M2 can be heated in the inert gas. The heating may also proceed in the reactant gas environment in which the reactant gas reacts with the heating region of the metal body M1, M2, or in the decompression condition or in the pressurization condition instead of the atmospheric condition.

Especially, during heating the metal body M2, M1 in the reactant gas environment, there may be a situation in which the strong strain or the surface coating resulted from the reaction occurred between the heating region of the metal body M2, M1 and the reactant gas will produce.

Furthermore, in the case where the metal body M2 is a hollow cylinder body, the inert gas or reactant gas is supplied in high pressure state or in reduced pressure state to the hollow portion of the metal body M2 in the STSP device, thereby creating a strong strain in the low deformation resistance region 30'.

In addition, inert liquid or reactant liquid is alternatively used instead of inert gas or reactant gas.

The STSP device is constituted as mentioned above. When the low deformation resistance region 30' in the metal body M2 will be twisted and accordingly the microstructure will be rendered fine, the metal body M2 is mounted on the STSP device, then the cooling unit 65 cools the both sides of the low deformation resistance region 30', while the heating unit 64 heats the low deformation resistance region 30'.

In this case, the heating of the heating unit 64 proceeds until the temperature of the low deformation resistance region 30' is higher than the recovery softening temperature of the strain produced in the metal body M2 and/or the recrystallization temperature of the microstructure. Once the recovery recrystallization temperature is got, the non-low deformation resistance region will rotate about the central axis of the metal body M2 and the low deformation resistance region 30' will twist by means of the rotating device.

The rotation speed of the non-low deformation resistance region caused by the rotating device is 1-20 rpm. The rotation number of turns is at least ½, the more the number is, the larger the shear deformation is, and the efficiency of fining the microstructure can be increased.

In addition, the heat temperature of the metal body M2 obtained by the heating unit 64 is higher than the recovery recrystallization temperature, but it is preferred that it is controlled to be lower than the temperature beginning to influence the grain refinement of the metal body.

After the low deformation resistance region 30' is thus twisted, said low deformation resistance region 30 should be cooled. In above embodiment, the structure of STSP device is such designed that the metal body M2 can not move along the extending direction, but the metal body M2 can do that, thereby it is possible to shift the position of the low deformation resistance region 30' of the metal body M2, and the shear treatment is supplied continuously to the metal body M2 by twisting, so the metal body M2 which makes the microstructure more fine within a large range is obtained.

Furthermore, according to circumstances, with respect to each of the low deformation resistance region 30' at the required position of the metal body M2, it is possible to adjust the fineness of the microstructure by adjusting the speed of the rotating device for the metal body M2, and to adjust the strength or ductility of the metal body M2. Therefore, the metal body M2 with partly increased strength or ductility can be produced.

Figure 11:
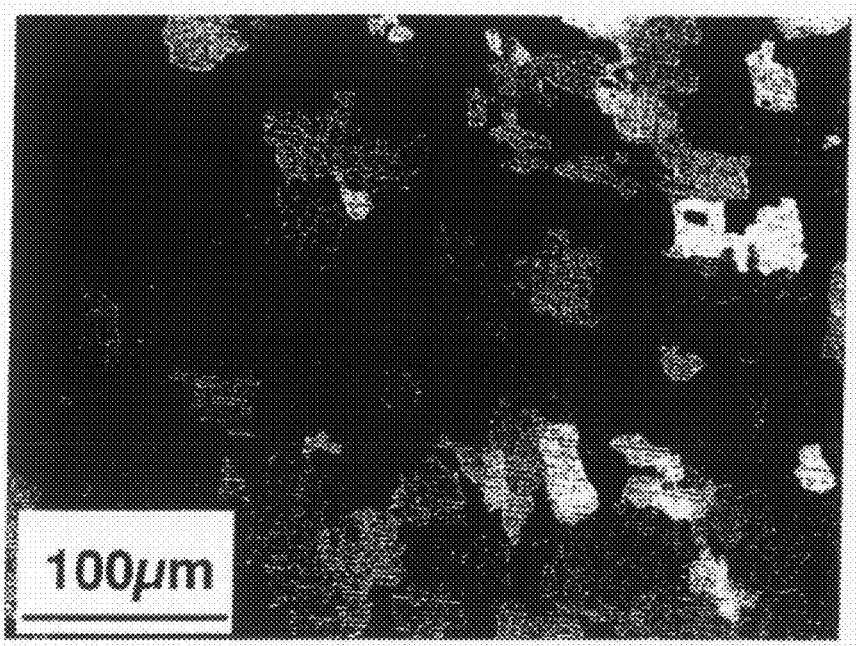
FIG. 11 is electron micrograph of the microstructure before treatment by STSP device.
Figure 12:
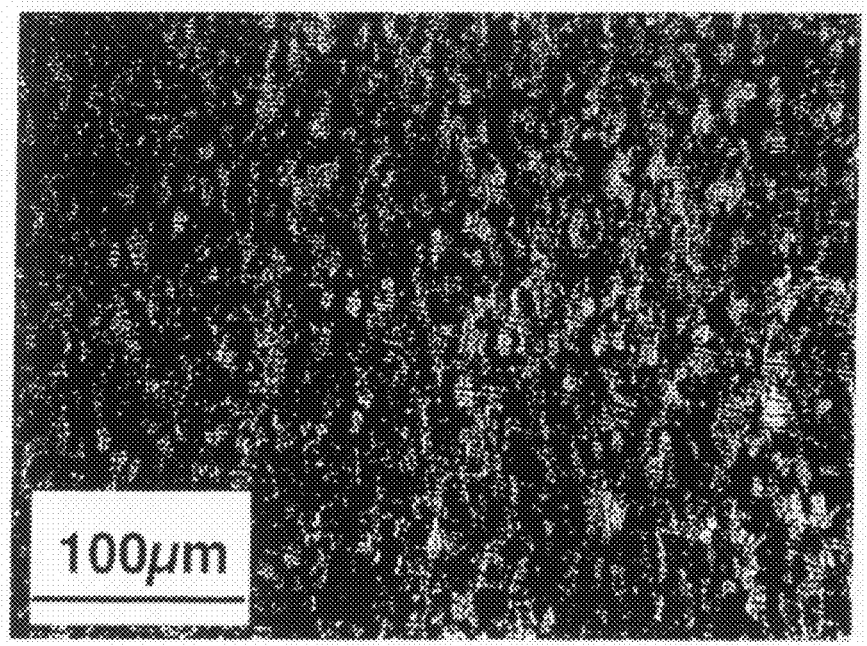
FIG. 12 is electron micrograph of the microstructure after treatment by STSP device.

FIG. 11 shows an electron micrograph of aluminum alloy, i.e. 5056, before treated by the above STSP device, and FIG. 12 shows an electron micrograph of A5056 after treated by the STSP device. It will be understood that it is possible to make the crystal grain of the microstructure fine from 60-70 μm to 5 μm or less by making the metal body M2 have shear deformation.

And the fineness of the crystal grain is preset by analyzing the heating and cooling conditions. For example, if the electron beam can only heat the very narrow region and can heat the deeper portion of the region, while the portion outside the region can keep low temperature by cooling itself, the boundary between the low deformation resistance regions and the non-low deformation resistance regions should be made to be very narrow, and the strong strain should be made to focus on the low deformation resistance regions, therefore, it is possible to make the crystal grain size to be tens nanometer to ten nanometer.

Figure 13:
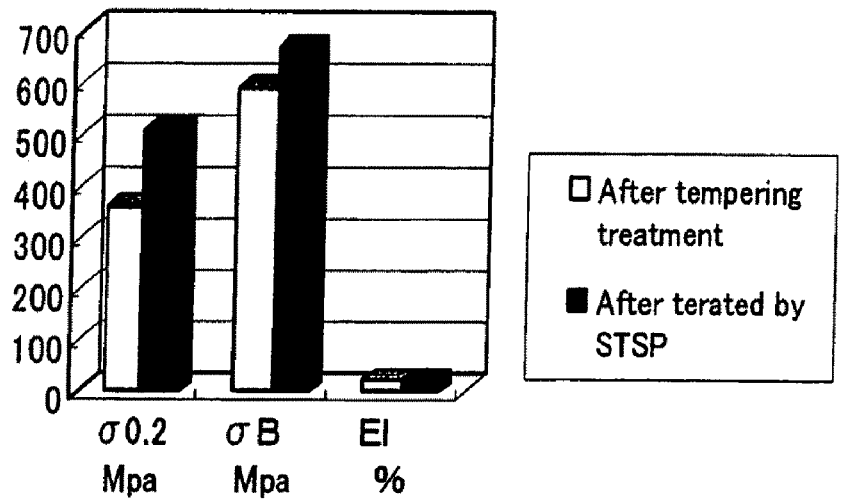
FIG. 13 is a curve diagram of physical property change when the microstructure is rendered fine in S45C.

And FIG. 13 shows a comparison result of the yield strength, tensile strength, uniform elongation rate between the metal body, i.e. S45C, treated by the above STSP device and the metal subjected to the tempering treatment similar to the thermal process of the treatment of the STSP device. It is observed that, by treatment of the STSP device, the uniform elongation rate (EI) cannot be increased, and the yield strength and the tensile strength can be improved.

Figure 14:
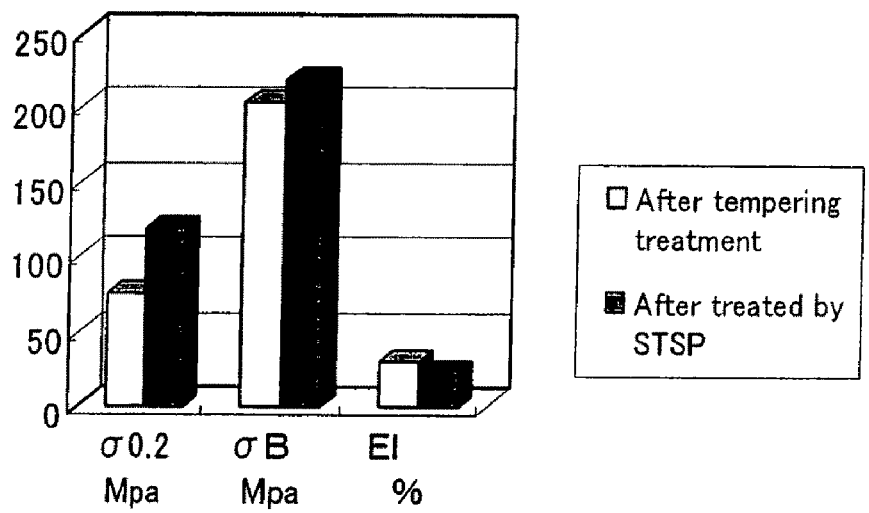
FIG. 14 is a curve diagram of physical property change when the microstructure is rendered fine in A1506.
Figure 15:
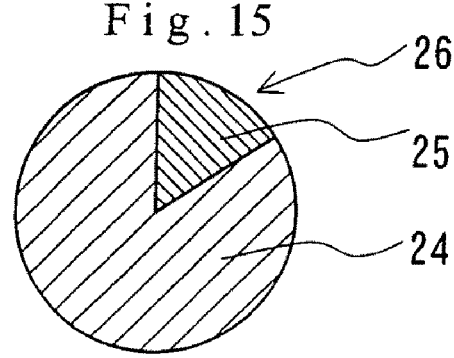
FIG. 15 is a schematic section of a metal body.

And FIG. 14 shows a comparison result of the yield strength, tensile strength, and uniform elongation rate between the metal body, i.e. A1506C, treated by the above STSP device and the metal body subjected to the tempering treatment similar to the thermal process of the treatment of the STSP device. It is observed that, just similar to the case of the S45C, by treatment of the STSP device, the uniform elongation rate can not be increased, and the yield strength and the tensile strength can be improved.

In this way, the low deformation resistance regions 30, 30' are partially produced in the metal body by the above SVSP device and the STSP device, are caused to have shear deformation and are supplied with strong strain, thereby, it is possible to fine the microstructure, and to improve the strength or ductility of the metal bodies M1, M2.

Furthermore, as shown in FIG. 1, when the metal body is a laminated body 10 made by laminated several of the metal layers, the metal contained in the two adjacent the metal layers is fined and, at the same time, is joined each other, by doing this, it is possible to obtain an integrated metal body, and to provide a metal body which compositions are changed in the laminated direction of the metal layers.

Or, as shown in the FIG. 5 which is a cross-section of the metal body, a notch of the first metal rod 24 obtained by cutting a portion of the round bar receives the second metallic material 25, and an integrated composite metal rod 26 is got. It is possible to join the first metal rod 24 with the second metallic material 25 mechanically to produce a new alloy by treating the composite metal rod 26 with STSP device.

Moreover, as shown in FIG. 2, when the metal body is a calcination body 16 combined with several kinds of metal powder, it is possible to obtain a tightly integrated metal body by making the microstructure of the metal powder fine and join concurrently. Especially, it is possible for the compound metal which cannot be made by the fusion method to join mechanically by SVSP device or STSP device to produce a new alloy.

Moreover, as shown in FIG. 3, when the metal body is a porous body 17 in which the holes are filled with metal powder 18 and has became a filled body 19, it is possible to obtain an integrated metal body by making the microstructure of the metal fine and join concurrently. Especially, it is possible for the compound metal which cannot be made by the fusion method to join mechanically by SVSP device or STSP device to produce a new alloy.

And as shown in FIG. 4, the metal rod can be made to be an integrated metal body by bundling a plurality of the metal wire together to form a wire bundle 23 and render the microstructure of the metal wire fine while joining together. Especially, it is possible for the compound metal, which cannot be made by the fusion method, to join mechanically by SVSP device or STSP device to produce a new alloy.

Especially, the metal body is made to be a hollow cylinder before its microstructure is fined by the SVSP or STSP device, and after fining the cylinder metal body is cut and can become a plate body. Thereby it is easy to provide a plate metal which microstructure has fined.

In the above SVSP device and the STSP device, by adjusting the length of the low deformation resistance regions 30, 30' in the extending direction of the metal body M1, M2, and supplying the low deformation resistance regions 30, 30' with the shear deformation, it is possible to make a portion of the low deformation resistance regions 30, 30', such as the central area, or the both sides or either side of the low deformation resistance regions 30, 30' proceed the shear deformation.

In addition, in the STSP device, it is realized from the structure, when the rotating device rotates the non-low deformation resistance region, the region which microstructure is not fined adequately will appear because there is no adequate shear deformation in the part of the low deformation resistance region 30 around the virtual axis of rotation.

Therefore, in the STSP device of the present embodiment, the metal body M2 is heated by the heating unit 64 to produce the low deformation resistance region 30, the heating of the heating unit 64 proceeds without taking the virtual axis of rotation as center.

In other words, in the case of the heating unit 64 comprising the high frequency heating coil as that in the present embodiment, the central axis of the coil offsets from the virtual axis of rotation of the rotation section 63 for rotating the metal body M2, and it is possible to heat the low deformation resistance region 30 without focusing on the virtual axis of rotation region, thereby to prevent the region without being fined from appearing in the region around the virtual axis of rotation, and in the STSP, it is also possible to fine the microstructure uniformly.

In this way, it is possible to fine reliably the microstructure of the region around the virtual axis of rotation by adjusting the arrangement of the heating unit 64 to make the heating distribution not to take the virtual axis of rotation as center.

The method of preventing the grain refinement of the microstructure in the STSP device from not being uniformly is also used as follows: to make one non-low deformation resistance region 30 and another non-low deformation resistance region between which the low deformation resistance region 30' is sandwiched move relative to each other along the direction approximately orthogonal to the extending direction of the metal body M1, by doing that, the virtual axis of rotation region of the low deformation resistance region 30' appears shear deformation, thereby the non-uniform fineness of the microstructure is avoided.

That is, the vibration supplier 47 of the SVSP device may be mounted in the STSP device to twist and vibrate the low deformation resistance region 30' simultaneously.

Or, by offsetting the virtual axis of rotation from the geometrical center of the metal body M2 with a round bar shape, the shear deformation will occur in the region near the virtual axis of rotation of the low deformation resistance region 30', thereby the non-uniform fineness of the microstructure is avoided.

Figure 16:
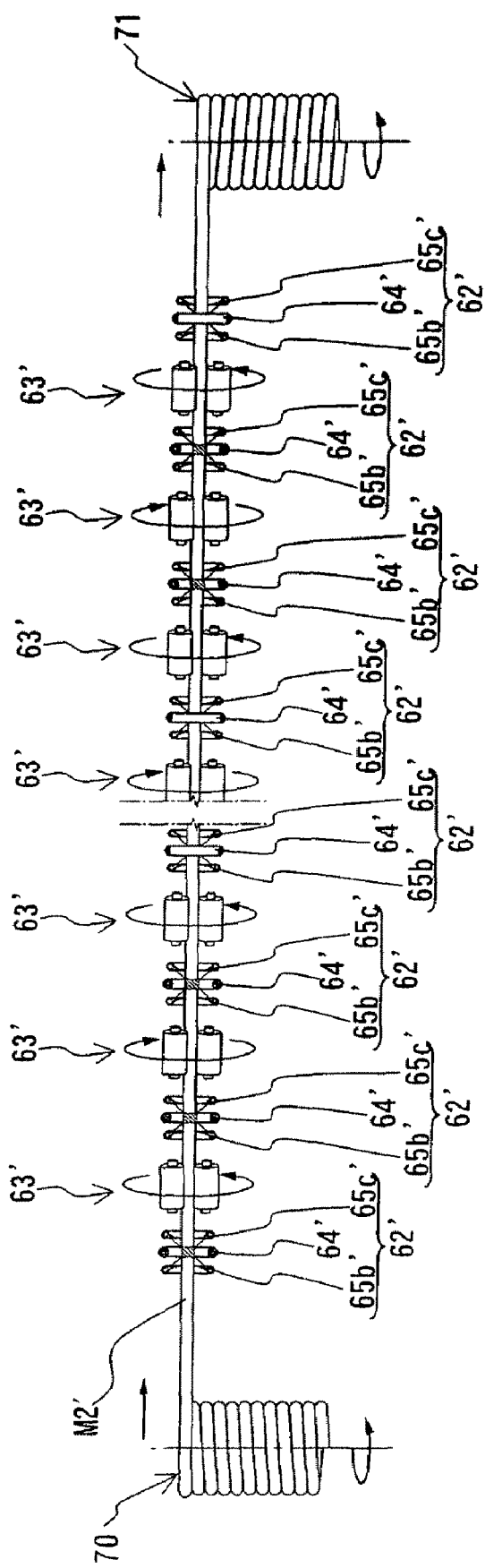
FIG. 16 is schematic explanatory drawing of one modified example of STSP device.

FIG. 16 shows schematically a modified example of the above STSP device which is provided with a supply section 70' for supplying the metal body M2' and a receiving section 71 for receiving the metal body M2' which has been subjected to the shear deformation.

When the supply section 70 supplies the metal body M2 wound in a desired reel, the metal body M2' is drawn by a pulling tool (not shown in figures) to be a straight line and is fed concurrently.

In the receiving section 71, the metal body M2' which has been subjected to the shear deformation is wound in a reel by a winding tool (not shown in figures).

In the STSP device, a plurality of shear deformation sections 62' are provided in the extending direction of the metal body M2' and separated from the supply section 70 and receiving section 71 with a preset interval, respectively, and the rotation section 63' is provided between the two adjacent shear deformation sections 62'. The rotation section 63' rotates the metal body M2' about the virtual axis of rotation approximately parallel to the extending direction of the metal body M2', and the shear deformation sections 62' can be subjected to shear deformation.

In the shear deformation section 62', it is provided with a high frequency coil 64' for heating the metal body M2', a first water outlet 65b' and a second water outlet 65c' for discharging the cooling water for cooling the metal body M2'. The high frequency coil 64' is located between the first water outlet 65b' and the second water outlet 65c', the region of the metal body M2' heated by the high frequency coil 64' can be minimized.

In the present embodiment, a pair of rollers is provided in the rotation section 63' for contacting with the metal body M2' and rotating the metal body M2'. Additionally, the rollers of the two adjacent rotation sections 63' rotate in the directions opposite to each other.

In such STSP device, the supply section 70 and the receiving section 71 as a feeding mechanism feed the metal body M2', thereby the metal body M2' is subjected to the shear deformation for several times.

Or, for example, in the case where N shear deformation sections 62' are provided in the metal body M2' along its extending direction with a preset interval T, if the supply section 70 and the receiving section 71 are used as carry mechanism for the metal body M2 to feed the metal body M2' with a preset interval and a constant distance, then it is possible to conduct the shear deformation in a range T×N in length at one time. Therefore, after finishing the shear deformation and feeding the metal body M2' for a T×N length, the shear deformation proceeds again. The metal body M2 is fed with a preset interval and a constant distance repeatedly. Thereby the productivity is increased.

Additionally, in such a case N is even number, alternatively, it is not as shown in FIG. 16, not all of the rotation sections 63' are provided between the shear deformation sections 62', but the rotation sections 63' are alternately provided between the adjacent shear deformation sections 62'.

As mentioned above, since the metal body has high strength after its microstructure is rendered fine, it will carry out to reduce the whole weight when the metal body is used for vehicle parts. The reduction of the vehicle weight is beneficial for the fuel consumption.

In this way, the metal body used for vehicle parts is manufactured as follows.

First, the metal sheet shall be performed pre-treatment. During the pretreatment, heating and then cooling the metal sheet adjusts the extent of uniphase, the dissipation of the metal grain constituting the metal sheet, the residual stress of the metal sheet and etc.

Next, the metal sheet with the pre-treatment will be worked by the SVSP device. When the microstructure of the metal sheet is rendered fine uniformly, the metal sheet with high strength and high ductility is formed.

Especially, in the case where the metal sheet is made from aluminum alloy, it is possible to produce a large piece of aluminum alloy sheet, and to produce a cover or shroud with complicated shape by forging. Thereby the cost of manufacture is reduced obviously.

Especially, because the cover or shroud can be integrally formed with flanges or jogged parts for connecting with other elements while forging, accordingly, integrate forming of the plurality of elements can reduce cost, and it is possible to increase the structural strength.

As stated above, it may not only produce the metal sheet to be a required metal body in the SVSP device, the metal body which has already become a required round bar with pretreatment but also can be worked in the STSP device, thereby a metal body with high strength and high ductility is obtained because the microstructure of the metal body is rendered fine uniformly.

Figure 17:
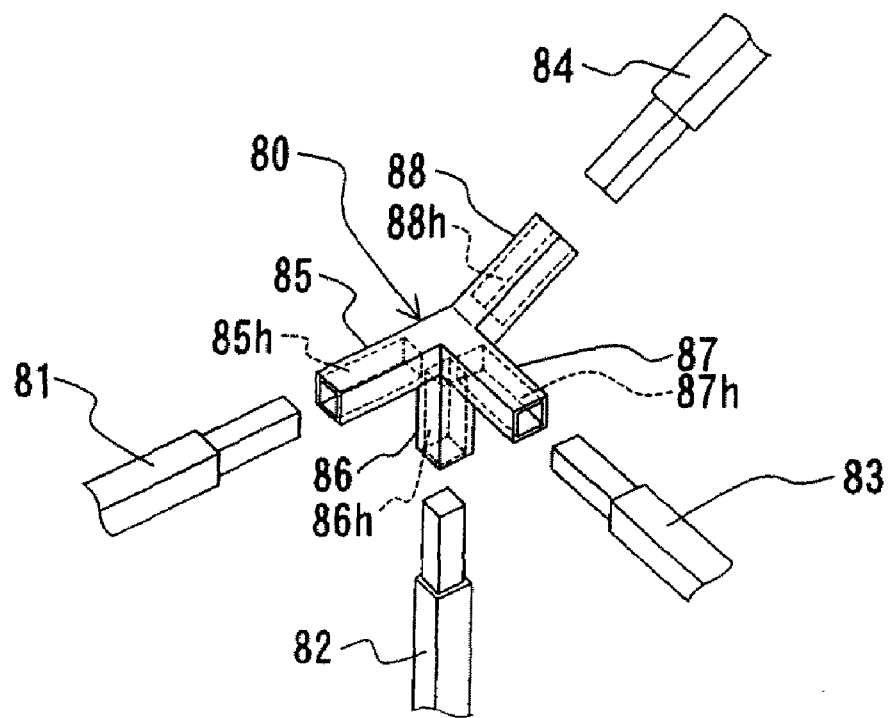
FIG. 17 is a schematic explanatory drawing of a bodywork frame.
Figure 18:
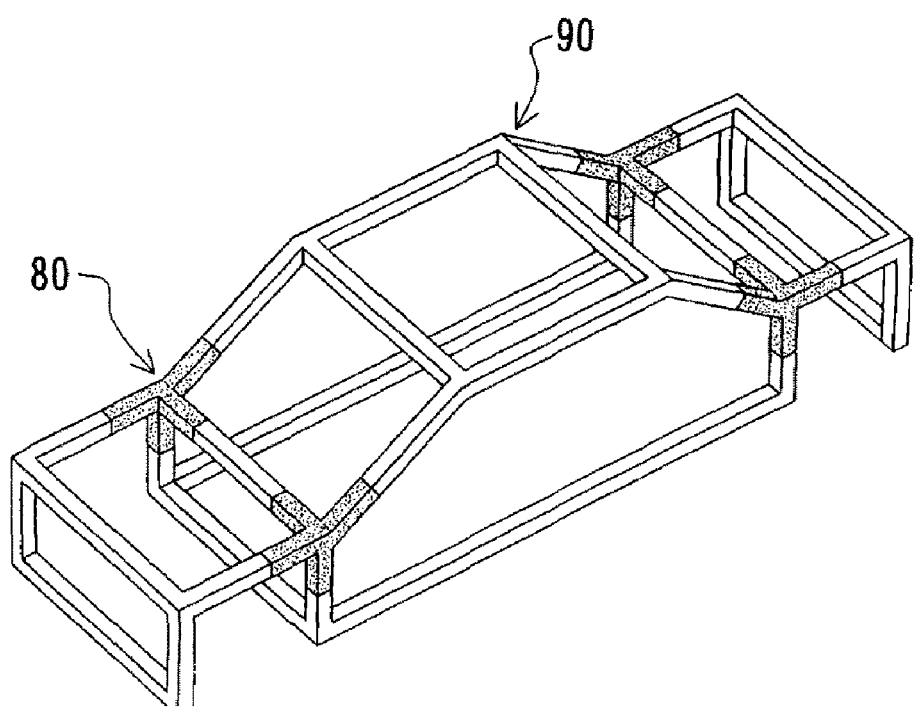
FIG. 18 is a schematic explanatory drawing of a bodywork frame.
Figure 19:
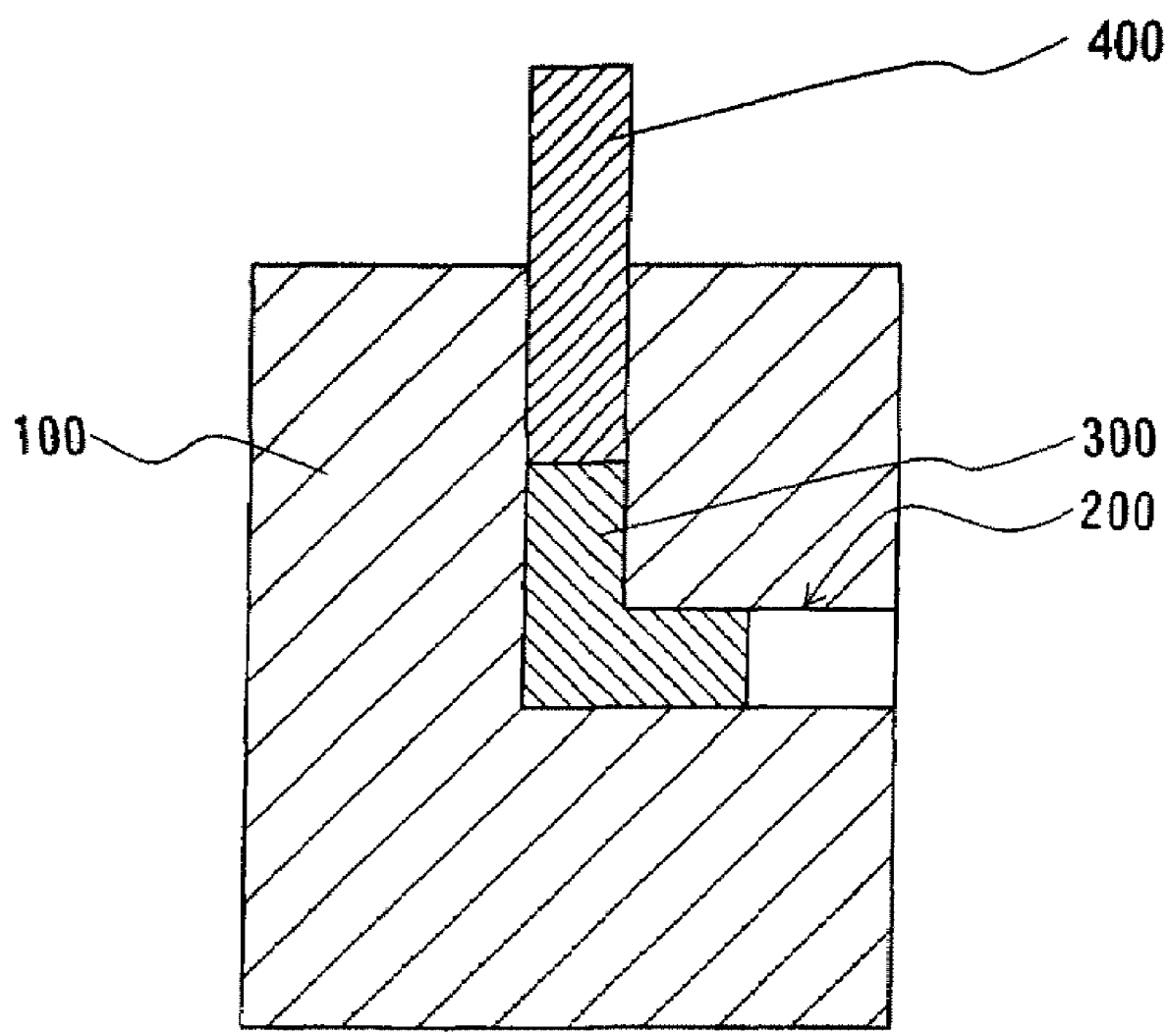
FIG. 19 is a reference drawing for explaining the ECAP.

Because of the high ductility of such metal body, the metal body, after being separated into different required portions, can be formed as a bodywork frame plug bush 80 with complicated shape by the forging metal mold with many cylinders, as shown in FIG. 18, the bodywork frame plug bushes 80 of the present embodiment are used for the joining part of the various frames of the bodywork frame 90. Usually, various frames are connected by welding in the connection portions, but it does not need welding operation by means of the bodywork frame plug bushes 80 as shown in FIG. 17, and it is possible to reduce the cost of manufacture. In addition, it is much more than that by welding to increase the structure strength, thereby, its reliability is increased.

In the bodywork frame plug bush 80 of FIG. 17, a first jogged portion 85, a second jogged portion 86, a third jogged portion 87 and a fourth jogged portion 88, which extend along the preset directions, are used for receiving a first frame 81, a second frame 82, a third frame 83 and a fourth frame 84, respectively.

In addition, insertion holes 85*h*, 86*h*, 87*h* and 88*h*, which are formed by inserting cylinders at the time of forging respectively, are provided in the jogged portions 85, 86, 87 and 88, respectively. The front ends of each frames 81, 82, 83 and 84 are inserted into the insertion holes 85*h*, 86*h*, 87*h* and 88*h* to connect with each other.

In another use mode, for a round bar part, such as a steering shaft, fining the microstructure is performed by SVSP method; thereby the round bar with high strength can be provided. In addition, it is possible not only to fine the microstructure of the round bar uniformly, but also to fine or not to fine a portion of the microstructure of the round bar, thereby to make the strength have intended partial difference.

In this way, in the case where the steering shaft is formed by the round bar with the different strength, the steering shaft is purposely forced to fracture by shock when the accident occurred, thereby it is possible to provide shock absorption.

In the case of forming screw thread, after fining the microstructure of the round bar by the SVSP method, the metal body is rotated by SVSP method to form the screw thread. Thereby it is easy to form screws with high strength.

In a similar manner, in the case of forming a transmission gear, after fining the microstructure of the metal body by the SVSP method, the metal body is rotated by SVSP method to form the gear teeth by required forging die, thereby it is easy to form the gears with high strength.

As stated above, not only can the metal body with fined microstructure be used for vehicle parts, but also can be used for the sputter target material of the sputtering equipment used in the semiconductor manufacturing process.

Especially, because the metal body having the required uniform components can be obtained while the microstructure is rendered fine relatively, a homogeneous metal film can be formed on the upper surface of the semiconductor substrate, and such sputter target material can be manufactured with a low cost compared with ECAP method.

The sputter target material is manufactured as follows.

First, the metal sheet having required components must be performed pretreatment. During the pre-treatment, the metal sheet is heated and then cooled to adjust the phase, the dissipation of the metal grain constituting the metal sheet and the residual stress of the metal sheet and etc.

Next, the metal sheet is worked in the SVSP device after the pre-treatment, thereby the microstructure of the metal sheet is rendered fine uniformly.

After the microstructure is rendered fine in the SVSP device, the metal sheet is rolled in normal temperature, cold forged, hot forged, or die forged, etc. Then, the crystal orientation of the fined microstructure is adjusted while forming the shape of the target material.

In this way, by adjusting the crystal orientation of the fined microstructure, it is possible to provide the sputter target material, which can form uniform metal film on the upper surface of the semiconductor substrate.

Further, in the case where the metal sheet is formed to be a target material shape, while the metal sheet is formed to be an approximately disk-like member, the cooling grooves are formed on the back thereof. Owing to the grooves formed concurrently, it is possible to reduce the process for manufacturing sputter target material, and it is possible to provide a low-cost sputter target material.

Especially, the forming performance of the metal sheet is increased because of the microstructure being fined in SVSP device, therefore, it is possible to produce the grooves with high precision by cold forging or hot forging.

Additionally, after the microstructure of the metal sheet is rendered fine uniformly in SVSP device, it is also possible to heat the metal sheet to a temperature, at which the fined metallic crystal doesn't intend to become coarse-grain, thus to adjust the residual stress of the metal sheet.

In another manufacturing method that can be used, the metal body used as the target material is made to be a bar-shape metal body with required components.

First, the metal bar is subjected to the same pre-treatment as above metal sheet, thereby it is possible to adjust the phase and the particle dispersion of the grain of the metal bar, further, to adjust the residual stress of the metal bar etc.

Then, the metal sheet having been subjected to the pretreatment is worked in the STSP device, thus the microstructure of the metal bar is rendered fine uniformly.

Especially, after the microstructure being fined in the STSP device, the metal bar is cut in preset length. Then, the metal sheet is formed by cold forging or hot forging.

The metal sheet as formed above is subjected to treatment in SVSP device so that the microstructure of the metal sheet is rendered fine further. Then, in the same manners as above-mentioned, the metal sheet is rolled in normal temperature, cold forged, hot forged, or die forged, etc, so that the crystal orientation of the fined microstructure is adjusted while forming the shape of the target material.

The metal body can also be produced as sputter target material by the combination of the STSP method and the SVSP method, and rendered its microstructure fine much more, thereby a sputter target material with a homogeneous metal film can be formed on the upper surface of the semiconductor substrate.

Especially, the metal bar can be treated by STSP method to make the components homogenization. Furthermore, if the sputter target material is made by the more homogenizing metal body, a sputter target material with a homogeneous metal film can be formed on the upper surface of the semiconductor substrate.

Not only is the said SVSP method or STSP method used for manufacturing the vehicle parts or sputter target material, but also it can provide a material or parts with improved property.

In the case where the metal body is magnetic, the machining property of the metal body can be increased through fining the microstructure by means of the SVSP method or STSP method. Thereby it can proceed for micro-machining of the fine wire. Moreover, it is possible to increase the magnetic susceptibility according to the circumstances.

In the case where the metal body is a memory alloy, the machining property of the metal body can be increased through fining the microstructure by means of the SVSP method or STSP method. Thereby it can proceed for further micro-machining of the fine wire. Especially, when the shape memory alloy is used to form the screws for assembling the electronics, the teeth of the screw will be disappeared by the shape memory when the electronics is discarded, thereby it is very easy to disassemble.

In the case where the metal body is a metal hydride, fining the microstructure of the metal body by the SVSP method or STSP method can increase the ability for storing the hydrogen. Further, the structure with Hydrogen storing function may be formed by increasing the machining property to form different kinds of shapes.

In the case where the metal body is a vibration damping alloy, fining the microstructure of the metal body by the SVSP method or STSP method can increase the machining property, thereby it can produce a more fine shape. Especially, the vibration damping alloy can be used for component parts of the sound unit, such as speaker, and it is possible to improve the timbre.

In the case where the metal body is an electrothermal material, fining the microstructure of the metal body by the SVSP method or STSP method can increase the deformability, thereby it can proceed a more fine shape.

In the case where the metal body is a biological material, fining the microstructure of the metal body by the SVSP method or STSP method will increase the machining property, thereby it can proceed a more fine shape.

Especially, the titanium alloy is used for biological material in the past, and there is a problem which the machining property of titanium is very bad because of the high hardness and thus the forming cost is too high. But when fining the microstructure by the SVSP method or the STSP method, titanium alloy can also be formed by forging, thereby it is possible to form a titanium alloy part in a preset shape with low cost.

In addition, titanium alloy which microstructure is rendered fine by SVSP method or STSP method may be used for a material with low Young's modulus and high strength, and it is also possible to improve the biology compatibility.

In this way, for the metal body treated by the SVSP method or the STSP method, not only is the ductility improved, but also the machining property is improved, furthermore, the strength is enhanced. Accordingly, it is possible to use the lighter material to form the parts with same strength, and make the transportation equipments such as ship, plane or vehicle, or buildings such as a very high office building, bridge and so on much lighter.

As stated above, according to the metal working method and the metal body obtained by the metal working method of the present invention, it is possible to provide a metal body with superior forging deformability owing to continuously refining the metal with high strength and high ductility. In addition, it is also possible to produce an alloy with new components which cannot be manufactured by conventional fusion method, therefore a new metal may be provided. Especially, according to the metal-containing ceramic body obtained by the metal work method of the present invention, it is possible to provide a metal-containing ceramic body in which the metal components and the non-metal components can be combined firmly and uniformly.

Moreover, according to the sputter target material obtained by the metal work of the present invention, it is possible to provide a sputter target material, which price is low and the homogeneous metal film can be refined on the semiconductor substrate.

The invention claimed is:

1. A method of working a metal, comprising the steps of
cooling a metal body extending in one direction by a first cooling mechanism and a second cooling mechanism along the extending direction of the metal;
heating the metal body by a heating mechanism provided between the first cooling mechanism and the second cooling mechanism thereby locally reducing the deformation resistance of the metal body and forming a low deformation resistance region crossing the metal body; and
changing a position of a first non-low deformation resistance region relative to a second non-low deformation resistance region in the metal body in a state that the low deformation resistance region is sandwiched between the first non-low deformation resistance region and the second non-low deformation resistance region thereby deforming the low deformation resistance region by shearing to make the microstructure of the metal body fine, wherein the position change is caused by a vibration applied to the metal body in the direction approximately orthogonal to the extending direction of the metal body.

2. A method of working a metal, comprising the steps of
cooling a metal body extending in one direction by a first cooling mechanism and a second cooling mechanism along the extending direction of the metal;
heating the metal body by a heating mechanism provided between the first cooling mechanism and the second cooling mechanism thereby locally reducing the deformation resistance of the metal body and forming a low deformation resistance region crossing the metal body; and
changing a position of a first non-low deformation resistance region relative to a second non-low deformation resistance region in the metal body in a state that the low deformation resistance region is sandwiched between the first non-low deformation resistance region and the second non-low deformation resistance region thereby deforming the low deformation resistance region by shearing to make the microstructure of the metal body fine,
wherein the position change is caused by a compound motion comprising a first vibration applied to the metal body along a first direction approximately orthogonal to the extending direction of the metal body, and a second vibration applied to the metal body along a second direction approximately orthogonal to the first direction and the extending direction of the metal body.

3. A method of working a metal, comprising the steps of
cooling a metal body extending in one direction by a first cooling mechanism and a second cooling mechanism along the extending direction of the metal;
heating the metal body by a heating mechanism provided between the first cooling mechanism and the second cooling mechanism thereby locally reducing the deformation resistance of the metal body and forming a low deformation resistance region crossing the metal body; and
changing a position of a first non-low deformation resistance region relative to a second non-low deformation resistance region in the metal body in a state that the low deformation resistance region is sandwiched between the first non-low deformation resistance region and the second non-low deformation resistance region thereby deforming the low deformation resistance region by shearing to make the microstructure of the metal body fine,
wherein the position change is caused by a twisting motion applied to the metal body about a virtual axis of rotation approximately parallel to the extending direction of the metal body.

4. The method of working a metal according to claim 3, wherein a width of the low deformation region is three or less times longer than a sectional width of a cross-section orthogonal to the extending direction of the metal.

5. The method of working a metal according to claim 3, wherein translation of the metal body in the extending direction is prevented during the step of changing the position of the first non-low deformation resistance region relative to the second non-low deformation resistance region.

6. The method of working a metal according to claim 3, making the first non-low deformation resistance region displace relative to the second non-low deformation resistance region along the direction approximately orthogonal to the extending direction of the metal body.

7. The method of working a metal according to any one of claims 1, 2, 3 and 6, wherein a compression stress is acted on the low deformation resistance regions along the extending direction of the metal body.

8. The method of working a metal according to any one of claims 1, 2, 3 and 6, further comprising the step of moving the low deformation resistance region along the extending direction of the metal body.

9. The method of working a metal according to claim 7, further comprising the step of moving the low deformation resistance region along the extending direction of the metal body.

10. The method of working metal according to any one of claims 1 and 2, wherein the metal body is a plate body.

11. The method of working a metal according to any one of claims 1 and 2, wherein the metal body is a plate body laminated with different metal layers.

12. The method of working a metal according to any one of claims 1 and 2, wherein the metal body is a plate body made from a mixing material including a first metal and a second metal.

13. The method of working a metal according to any one of claims 1, 2 and 3, wherein the metal body is a hollow cylinder.

14. The method of working a metal according to any one of claims 1, 2 and 3, wherein the metal body is a hollow cylinder laminated with different metal layers.

15. The method of working a metal according to any one of claims 1, 2 and 3, wherein the metal body is a hollow cylinder made from a mixing material including a first metal and a second metal.

16. The method of working a metal according to any one of claims 1, 2 and 3, wherein the metal body is a hollow cylinder and becomes a plate body by cutting the circumference of the hollow cylinder after the non-low deformation resistance region displacing.

17. The method of working a metal according to any one of claims 1, 2 and 3, wherein the metal body is a hollow cylinder laminated with different metal layers and becomes a plate body by cutting the circumference of the hollow cylinder after the non-low deformation resistance region displacing.

18. The method of working a metal according to any one of claims 1, 2 and 3, wherein the metal body is a hollow cylinder made from a mixing material including a first metal and a second material, and becomes a plate body by cutting the circumference of the hollow cylinder after the non-low deformation resistance region displacing.

19. The method of working a metal according to any one of claims 1, 2 and 6, wherein the metal body is a round bar.

20. The method of working a metal according to any one of claims 1, 2 and 6, wherein the metal body is a bar laminated with different metal layers.

21. The method of working a metal according to any one of claims 1, 2 and 6, wherein the metal body is a bar made from a mixing material including a first metal and a second metal.

22. The method of working a metal according to any one of claims 1, 2 and 6, wherein the metal body is a bar made by at least bundling a first metal wire and a second metal wire together.

23. A metal body, elongated in one direction, the metal body having a fine microstructure which is formed by a method comprising the steps of:
cooling the metal body using a first cooling mechanism and a second cooling mechanism arranged along the elongated direction of the metal body;
heating the metal body locally with a heating mechanism arranged between the first cooling mechanism and the second cooling mechanism thereby locally reducing the deformation resistance to temporarily form a low deformation resistance region crossing the metal body, which is sandwiched by first and second non-low deformation resistance regions; and
displacing one of the non-low deformation resistance regions relative to the other non-low deformation resistance region, to deform the low deformation resistance region by shearing, wherein the displacing is caused by a vibration applied to the metal body in the direction approximately orthogonal to the extending direction of the metal body.

24. A metal body, elongated in one direction, the metal body having a fine microstructure which is formed by a method comprising the steps of:
cooling the metal body using a first cooling mechanism and a second cooling mechanism arranged along the elongated direction of the metal body;
heating the metal body locally with a heating mechanism arranged between the first cooling mechanism and the second cooling mechanism thereby locally reducing the deformation resistance to temporarily form a low deformation resistance region crossing the metal body, which is sandwiched by first and second non-low deformation resistance regions; and
displacing one of the non-low deformation resistance regions relative to the other non-low deformation resistance region, to deform the low deformation resistance region by shearing, wherein the displacing is caused by a compound motion comprising a first vibration along a first direction approximately orthogonal to the extending direction of the metal body, and a second vibration along a second direction approximately orthogonal to the first direction and the extending direction of the metal body.

25. A metal body, elongated in one direction, the metal body having a fine microstructure which is formed by a method comprising the steps of:
cooling the metal body using a first cooling mechanism and a second cooling mechanism arranged along the elongated direction of the metal body;
heating the metal body locally with a heating mechanism arranged between the first cooling mechanism and the second cooling mechanism thereby locally reducing the deformation resistance to temporarily form a low deformation resistance region crossing the metal body, which is sandwiched by first and second non-low deformation resistance regions; and
displacing one of the non-low deformation resistance regions relative to the other non-low deformation resistance region, to deform the low deformation resistance region by shearing, wherein the displacing is caused by a twisting motion about a virtual axis of rotation approximately parallel to the extending direction of the metal body.

26. The metal body according to claim 25, wherein one the non-low deformation resistance region is caused to displace relative to another the non-low deformation resistance region along the direction approximately orthogonal to the extending direction of the metal body.

27. The metal body according to any one of claims 23, 24, 25 and 26, wherein as part of the displacing step a compression stress is caused to act on the non-low deformation resistance regions along the extending direction of the metal body.

28. The metal body elongated in one direction according to any one of claims 23, 24, 25 and 26, wherein as part of the displacing step the non-low deformation resistance region is made to displace along the extending direction of the metal body.

29. The metal body elongated in one direction according to claim 27, wherein as part of the displacing step the non-low deformation resistance region is made to displace along the extending direction of the metal body.

30. The metal body according to any one of claims 23 and 24, wherein the metal body is a plate shape.

31. The metal body according to any one of claims 23 and 24, wherein the metal body is a plate body laminated with different metal layers.

32. The metal body according to any one of claims 23 and 24 wherein the metal body is a plate body made from a mixing material including a first metal and a second metal.

33. The metal body according to any one of claims 23, 24 and 25, wherein the metal body is a hollow cylinder.

34. The metal body according to any one of claims 23, 24 and 25, wherein the metal body is a hollow cylinder laminated with different metal layers.

35. The metal body according to any one of claims 23, 24 and 25, wherein the metal body is a hollow cylinder made from a mixing material including a first metal and a second metal.

36. The metal body according to any one of claims 23, 24 and 25, wherein the metal body is a hollow cylinder and become a plate body by cutting the circumference of the hollow cylinder after the non-low deformation resistance region displacing.

37. The metal body according to any one of claims 23, 24 and 25, wherein the metal body is a hollow cylinder laminated with different metal layers and become a plate body by cutting the circumference of the hollow cylinder after the non-low deformation resistance region displacing.

38. The metal body according to any one claims 23, 24 and 25, wherein the metal body is a hollow cylinder made from a mixing material including a first metal and a second material and become a plate body by cutting the circumference of the hollow cylinder after the non-low deformation resistance region displacing.

39. The metal body according to any one of claims 23, 24, 25 and 26, wherein the metal body is a bar.

40. The metal body according to any one of claims 23, 24, 25 and 26, wherein the metal body is a bar laminated with different metal layers.

41. The metal body according to any one of claims 23, 24, 25 and 26, wherein the metal body is a bar made from a mixing material including a first metal and a second metal.

42. The metal body according to any one of claims 23, 24, 25 and 26, wherein the metal body is a bar made by at least bundling a first metal wire and a second metal wire together.

43. The metal body according to claim 23, wherein the metal body is a vehicle part.

44. The metal body according to claim 23, wherein the metal body is any one of the following: a Sputter target material, a magnetic body, a shape memory alloy, a metal hydride, a vibration damping alloy, an electrothermal material, a biological material, ship parts, aircraft components, parts of load-carrying equipment except vehicles, building construction members.

45. The metal body according to claim 25, wherein a width of the low deformation region is three or less times longer than a sectional width of a cross-section orthogonal to the extending direction of the metal.

46. The metal body according to claim 25, wherein translation of the metal body in the extending direction is prevented during the step of changing the position of the first non-low deformation resistance region relative to the second non-low deformation resistance region.

\* \* \* \* \*